(12) United States Patent
Ono et al.

(10) Patent No.: US 11,994,180 B1
(45) Date of Patent: May 28, 2024

(54) CLUTCH CONTROL DEVICE

(71) Applicant: HONDA MOTOR CO., LTD., Tokyo (JP)

(72) Inventors: Junya Ono, Tokyo (JP); Yoshiaki Tsukada, Tokyo (JP); Takashi Ozeki, Tokyo (JP); Koichi Furusato, Tokyo (JP); Yuma Kaibe, Tokyo (JP); Ryohei Tsuzuki, Tokyo (JP); Yasushi Fujimoto, Tokyo (JP); Tatsuya Ryuzaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/284,083

(22) PCT Filed: Mar. 15, 2022

(86) PCT No.: PCT/JP2022/011703
§ 371 (c)(1),
(2) Date: Sep. 26, 2023

(87) PCT Pub. No.: WO2022/209869
PCT Pub. Date: Oct. 6, 2022

(30) Foreign Application Priority Data

Mar. 31, 2021  (JP) ................................. 2021-062322

(51) Int. Cl.
*F16D 48/06* (2006.01)

(52) U.S. Cl.
CPC ........ *F16D 48/06* (2013.01); *F16D 2500/102* (2013.01); *F16D 2500/10412* (2013.01); *F16D 2500/1117* (2013.01); *F16D 2500/3023* (2013.01); *F16D 2500/3067* (2013.01);
(Continued)

(58) Field of Classification Search
CPC ............... F16D 48/06; F16D 2500/102; F16D 2500/1023; F16D 2500/10412; F16D 2500/1045; F16D 2500/1117; F16D 2500/3067; F16D 2500/31413; F16D 2500/7041; F16D 2500/5048
See application file for complete search history.

(56) References Cited

FOREIGN PATENT DOCUMENTS

| JP | 60-129522 | 8/1985 |
|---|---|---|
| JP | 2005-106246 | 4/2005 |

(Continued)

OTHER PUBLICATIONS

International Search Report and Written Opinion for International Application No. PCT/JP2022/011703 mailed on Apr. 26, 2022, 9 pages.

*Primary Examiner* — Timothy Hannon
(74) *Attorney, Agent, or Firm* — Amin, Turocy & Watson, LLP

(57) ABSTRACT

This clutch control device includes a clutch apparatus configured to connect and disconnect power transmission between a prime mover and an output target, a clutch actuator configured to output a driving force for actuating the clutch apparatus, a control unit configured to drive the clutch actuator, and an operating force transmission mechanism configured to transmit an operating force of a driver with respect to a clutch operator to the clutch apparatus, an operating force sensor configured to detect the operating force of the driver is provided in the operating force transmission mechanism, and the control unit drives the clutch actuator according to a detection value of the operating force sensor.

5 Claims, 15 Drawing Sheets

(52) U.S. Cl.
CPC .............. *F16D 2500/31413* (2013.01); *F16D 2500/5048* (2013.01); *F16D 2500/7041* (2013.01)

(56) References Cited

FOREIGN PATENT DOCUMENTS

| | | |
|---|---|---|
| JP | 2010-167798 | 8/2010 |
| WO | 2020/213333 | 10/2020 |

CLUTCH CONTROL DEVICE

TECHNICAL FIELD

The present invention relates to a clutch control device.

The present application claims priority based on Japanese Patent Application No. 2021-062322 filed on Mar. 31, 2021, the contents of which are incorporated herein by reference.

BACKGROUND ART

In a saddle riding vehicle in recent years, an automatic clutch system configured to automatically perform a connection/disconnection operation of a clutch apparatus through electrical control has been proposed (for example, see Patent Document 1).

RELATED ART DOCUMENT

Patent Document

Patent Document 1: Japanese Unexamined Patent Application, First Publication No. 2005-106246

SUMMARY

Problems to be Solved by the Invention

In technologies in the related art, it is conceivable to use a clutch actuator for clutch actuation to assist a clutch operation by a driver. That is, control such as driving the clutch actuator to maintain a half clutch state is conceivable. This control is performed, for example, when there is a possibility of engine stall if the driver's clutch operation remains as it is, or the like.

However, if a clutch operation by the driver is not taken into account and the clutch is simply connected and disconnected, there is a problem of causing discomfort in the driver.

In consideration of the above-mentioned circumstances, the present invention is directed to suppress discomfort when assisting an operation with a clutch actuator in a clutch control device configured to control connection/disconnection of a clutch apparatus.

Means for Solving the Problem

As means for solving the above-mentioned problems, an aspect of the present invention includes a clutch apparatus configured to connect and disconnect power transmission between a prime mover and an output target; a clutch actuator configured to output a driving force for actuating the clutch apparatus; a control unit configured to drive the clutch actuator; and an operating force transmission mechanism configured to transmit an operating force of a driver with respect to a clutch operator to the clutch apparatus, an operating force sensor configured to detect the operating force of the driver being provided in the operating force transmission mechanism, and the control unit driving the clutch actuator according to a detection value of the operating force sensor.

According to this configuration, it is possible to cooperate with the clutch operation (manual operation) by the driver to perform assist-driving of the clutch actuator. Accordingly, assistance such as engine stall avoidance or the like can be performed by driving the clutch actuator while suppressing discomforting behavior with respect to the manual operation by the driver.

In the above-mentioned aspect, the operating force transmission mechanism may include a release shaft configured to receive the operating force of the driver and the driving force of the clutch actuator and transmit the operating force and the driving force to the clutch apparatus, and the operating force sensor may be attached to the release shaft.

According to this configuration, by attaching the operating force sensor to the release shaft configured to receive both the operating force of the driver and the driving force of the clutch actuator, the following effects are provided. That is, in the release shaft in which the operating force of the driver and the driving force of the clutch actuator are merged, the operating force of the driver can be detected. Accordingly, when the clutch actuator is cooperation-controlled according to the clutch operation by the driver, the operating force of the driver can be appropriately detected.

In the above-mentioned aspect, the release shaft may include an upper release shaft configured to receive the operating force of the driver, a lower release shaft that constitutes a lower portion, and an intermediate release shaft disposed to bridge between a lower end portion of the upper release shaft and an upper end portion of the lower release shaft, and the operating force sensor may be attached to the upper release shaft.

According to this configuration, by providing the operating force sensor on the upper release shaft configured to receive the operating force of the driver, the operating force of the driver can be appropriately detected.

In the above-mentioned aspect, the operating force sensor may be a non-contact type magnetostrictive sensor.

According to this configuration, by detecting the operating force of the driver using the non-contact type magnetostrictive sensor, the following effects are provided. That is, the operating force of the driver can be detected without interfering with the operation of the driver due to friction and resistance of the sensor. In addition, compared to using an adhesion type strain gauge, or the like, installation of the sensor is easier and mass productivity can be increased.

In the above-mentioned aspect, cooperation control according to a detection value of the operating force sensor may be performed when it is determined that driving of the clutch actuator is necessary according to a change of a predetermined control parameter.

According to this configuration, a configuration is possible in which the clutch actuator operates only under timings or conditions that require cooperation control. For this reason, electric power consumption and control load can be suppressed compared to a configuration in which the clutch actuator is always in operation.

Advantage of the Invention

According to the present invention, it is possible to suppress discomfort when assisting an operation by a clutch actuator in a clutch control device configured to control connection/disconnection of a clutch apparatus.

DESCRIPTION OF THE EMBODIMENTS

Figure 1:
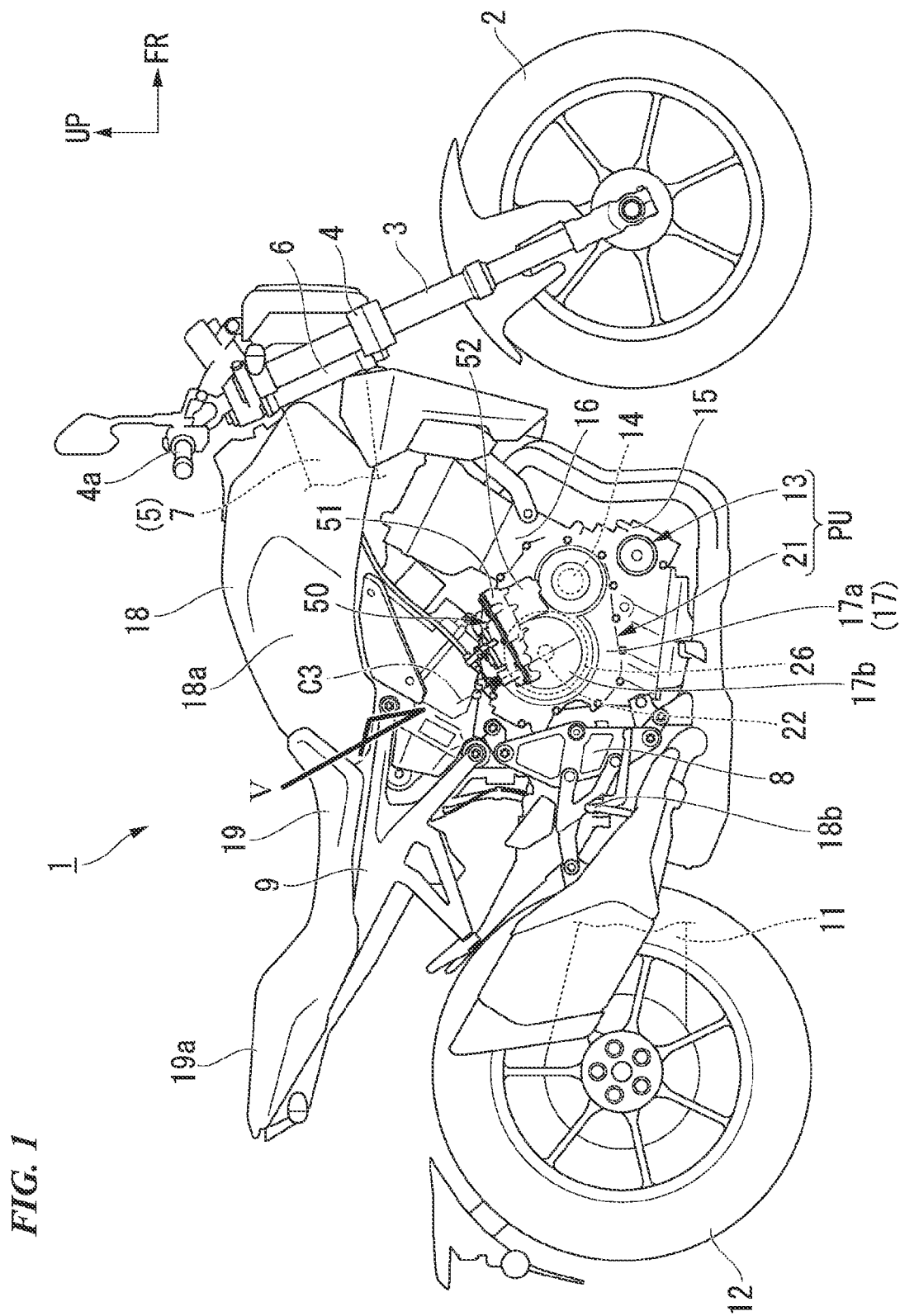
FIG. 1 is a right side view of a motorcycle of an embodiment.

Hereinafter, an embodiment of the present invention will be described with reference to the accompanying drawings. Further, unless otherwise specified, directions such as forward, rearward, leftward, rightward, and the like, in the following description are the same as the directions in a vehicle described below. In addition, in appropriate places in the drawings used in the following description, an arrow FR indicates a forward direction in the vehicle, an arrow LH indicates a leftward direction of the vehicle, and an arrow UP indicates an upward direction of the vehicle.

<Entire Vehicle>

As shown in FIG. 1, the embodiment is applied to a motorcycle 1 as an example of a saddle riding vehicle. A front wheel 2 of the motorcycle 1 is supported by lower end portions of a pair of left and right front forks 3. Upper portions of the left and right front forks 3 are supported by a head pipe 6 of a front end portion of a vehicle body frame 5 via a steering stem 4. A bar type steering handle 4a is attached onto a top bridge of the steering stem 4.

The vehicle body frame 5 includes the head pipe 6, a main frame 7 extending downward and rearward from the head pipe 6 at a center in the vehicle width direction (leftward/rightward direction), a pivot frame 8 provided below a rear end portion of the main frame 7, and a seat frame 9 continuous with a side behind the main frame 7 and the pivot frame 8. A front end portion of a swing arm 11 is swingably supported on the pivot frame 8. A rear wheel 12 of the motorcycle 1 is supported on a rear end portion of the swing arm 11.

A fuel tank 18 is supported above the left and right main frames 7. A front seat 19 and a rear seat 19a are supported behind the fuel tank 18 and above the seat frame 9. Knee grip portions 18a recessed inward in the vehicle width direction are formed on both left and right sides of a rear portion of the fuel tank 18. The left and right knee grip portions 18a are formed to match the following areas. These areas are inside around left and right knees of a driver sitting on the front seat 19. Steps 18b are supported on left and right sides below the front seat 19. The driver puts his/her feet in front of ankles on the steps 18b.

A power unit PU including a prime mover of the motorcycle 1 is suspended below the main frame 7. The power unit PU integrally has an engine (internal combustion engine, prime mover) 13 located in the front thereof, and a gearbox 21 located in the rear thereof. For example, the engine 13 is a multi-cylinder engine in which a rotary shaft of a crankshaft 14 is aligned with a leftward/rightward direction (vehicle width direction).

The engine 13 has a cylinder 16 standing above a front portion of a crank case 15. A rear portion of the crank case 15 is a gearbox case 17 that accommodates the gearbox 21. A right cover 17a crossing over a right side portion of the gearbox case 17 is attached to a right side portion of the crank case 15. The right cover 17a is a clutch cover configured to cover a clutch apparatus 26. The power unit PU is linked to the rear wheel 12 via, for example, a chain type transmission mechanism (not shown).

<Gearbox>

Figure 2:
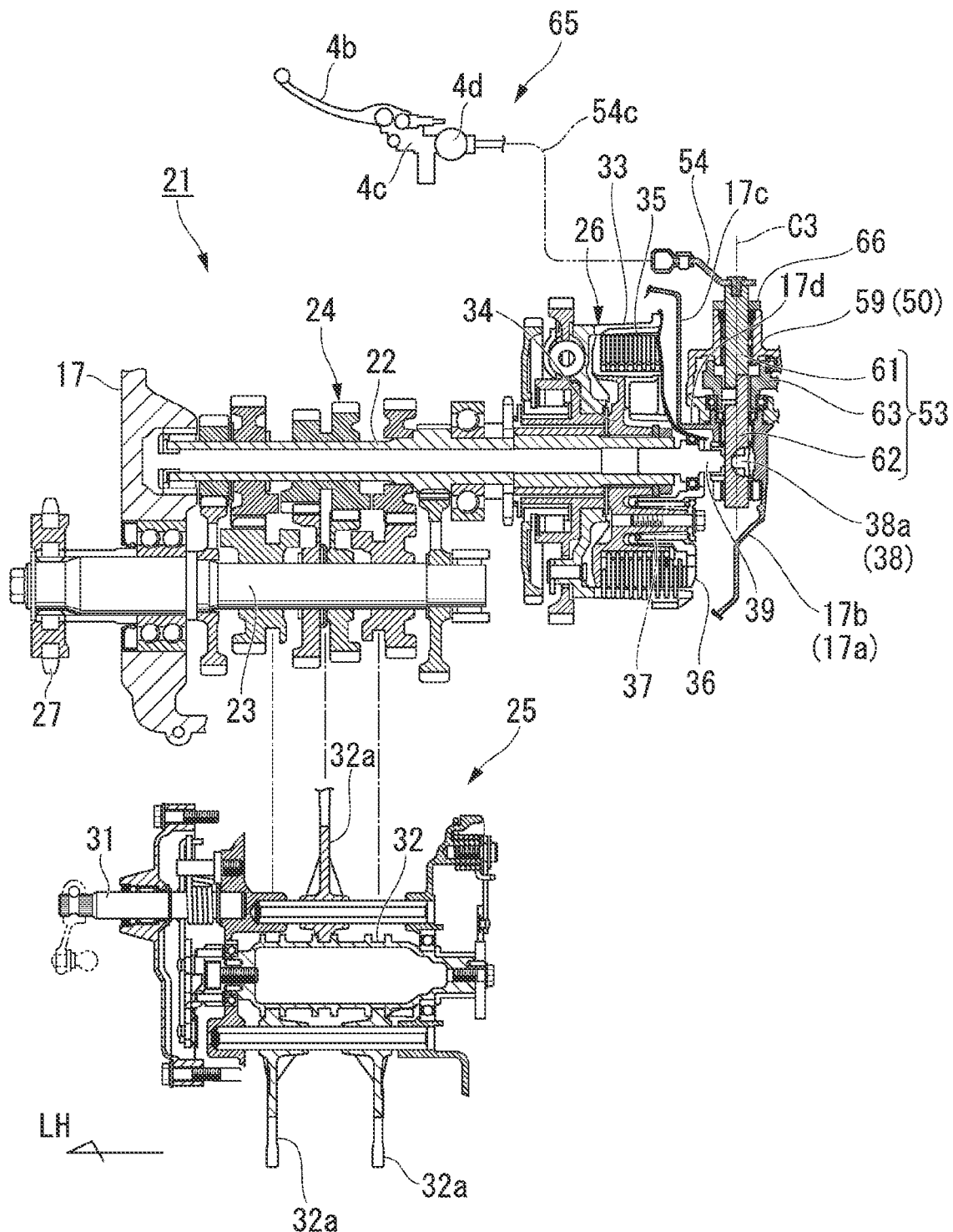
FIG. 2 is a cross-sectional view of a gearbox and a change mechanism of the motorcycle.

Referring also to FIG. 2, the gearbox 21 is a stepped transmission. The gearbox 21 has a main shaft 22 and a counter shaft 23, and a shifting gear group 24 bridging between both the shafts 22 and 23. The counter shaft 23 constitutes an output shaft of the gearbox 21 and the power unit PU. A left end portion of the counter shaft 23 protrudes leftward from a rear portion of the gearbox case 17 and is connected to the rear wheel 12 via the chain type transmission mechanism.

The main shaft 22 and the counter shaft 23 of the gearbox 21 are disposed behind the crankshaft 14. The clutch apparatus 26 is disposed coaxially with a left end portion of the main shaft 22. The clutch apparatus 26 connects and disconnects power transmission between the crankshaft 14 of the engine 13 and the main shaft 22 of the gearbox 21. The clutch apparatus 26 is connected and disconnected by at least one of an operation of a clutch operator by an occupant and an actuation of a clutch actuator 50, which will be described below. For example, the clutch operator is a clutch lever 4b.

The clutch apparatus 26 is, for example, a wet multi-plate clutch, a so-called normally closed clutch. A rotational moving force of the crankshaft 14 is transmitted to the main shaft 22 via the clutch apparatus 26, and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding leftward from the rear portion of the crank case 15.

A change mechanism 25 configured to switch a gear pair of the shifting gear group 24 is accommodated in the gearbox case 17 in the vicinity of the gearbox 21. The change mechanism 25 has a hollow cylindrical shift drum 32 parallel to both the shafts 22 and 23. The change mechanism 25 actuates a plurality of shift forks 32a using rotation of the shift drum 32. This actuation is performed according to a pattern of a lead groove formed in an outer circumference of the shift drum 32. This actuation causes the change mechanism 25 to switch the gear pairs used for power transmission between both the shafts 22 and 23 in the shifting gear group 24.

Here, in the motorcycle 1, only a gear shifting operation (a foot operation of a shift pedal (not shown)) of the gearbox 21 is performed by a driver, and a connection/disconnection operation of the clutch apparatus 26 is automatically performed by electrical control according to the operation of the shift pedal. That is, the motorcycle 1 employs a so-called semi-automatic gear shifting system (automatic clutch type gear shifting system).

<Gear Shifting System>

Figure 3:
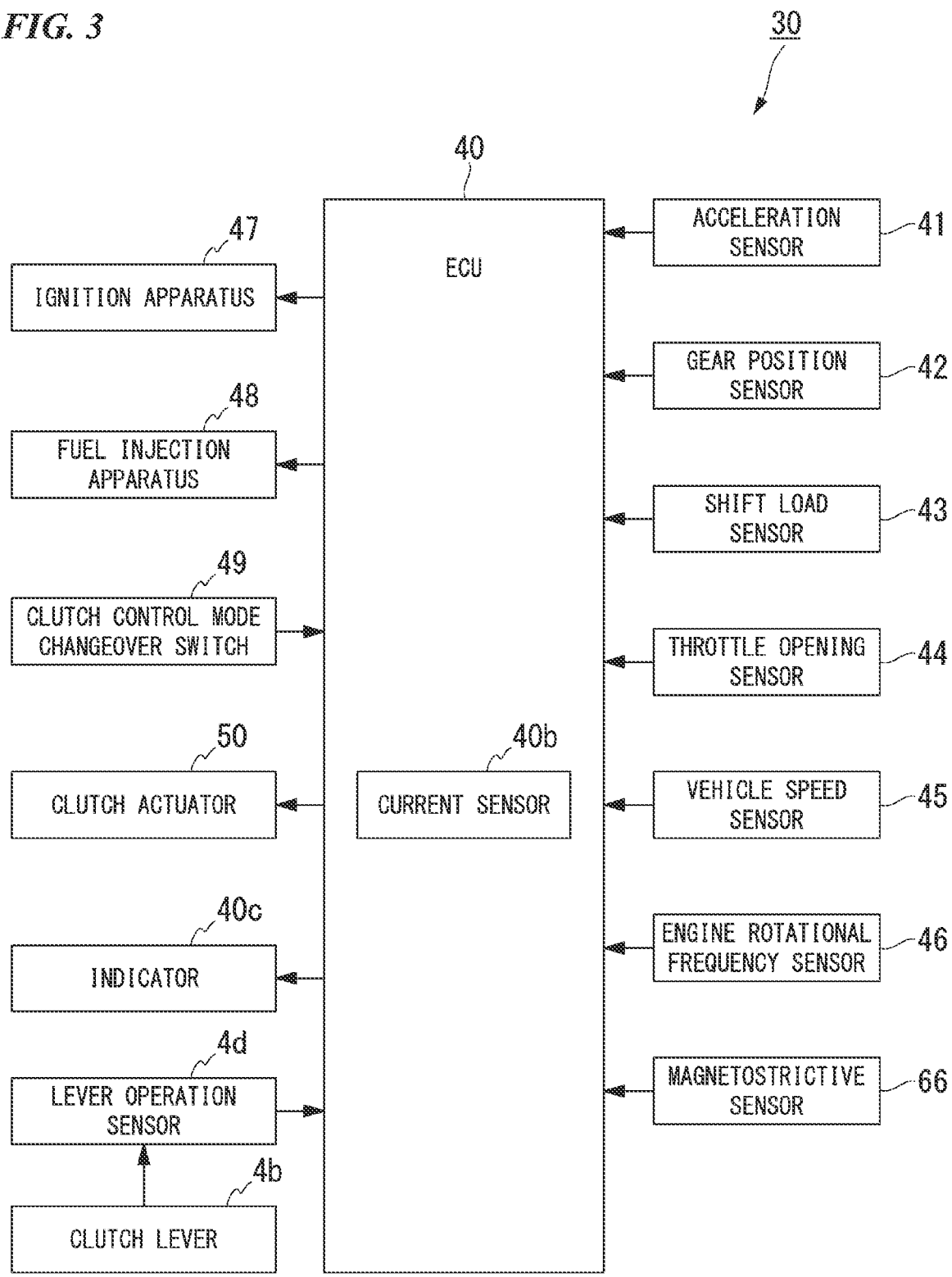
FIG. 3 is a block diagram of a gear shifting system of the motorcycle.

As shown in FIG. 3, the gear shifting system 30 includes the clutch actuator 50, an electronic control unit (ECU, control unit) 40, various sensors 41 to 46, and various apparatuses 47, 48 and 50.

The ECU 40 controls actuation of an ignition apparatus 47 and a fuel injection apparatus 48, and actuation of the clutch actuator 50. This control is performed on the basis of detection information from an acceleration sensor 41, a gear position sensor 42 and a shift load sensor 43 (for example, torque sensor), various vehicle state detection information from a throttle opening sensor 44, a vehicle speed sensor 45 and an engine rotational frequency sensor 46, and the like.

The acceleration sensor 41 detects a behavior of a vehicle body. The gear position sensor 42 detects a variable speed level from a rotational angle of the shift drum 32. The shift load sensor 43 detects an operation torque input to a shift spindle 31 (see FIG. 2) of the change mechanism 25. The throttle opening sensor 44 detects a throttle opening. The vehicle speed sensor 45 detects a vehicle speed. The engine rotational frequency sensor 46 detects an engine rotational frequency.

Figure 5:
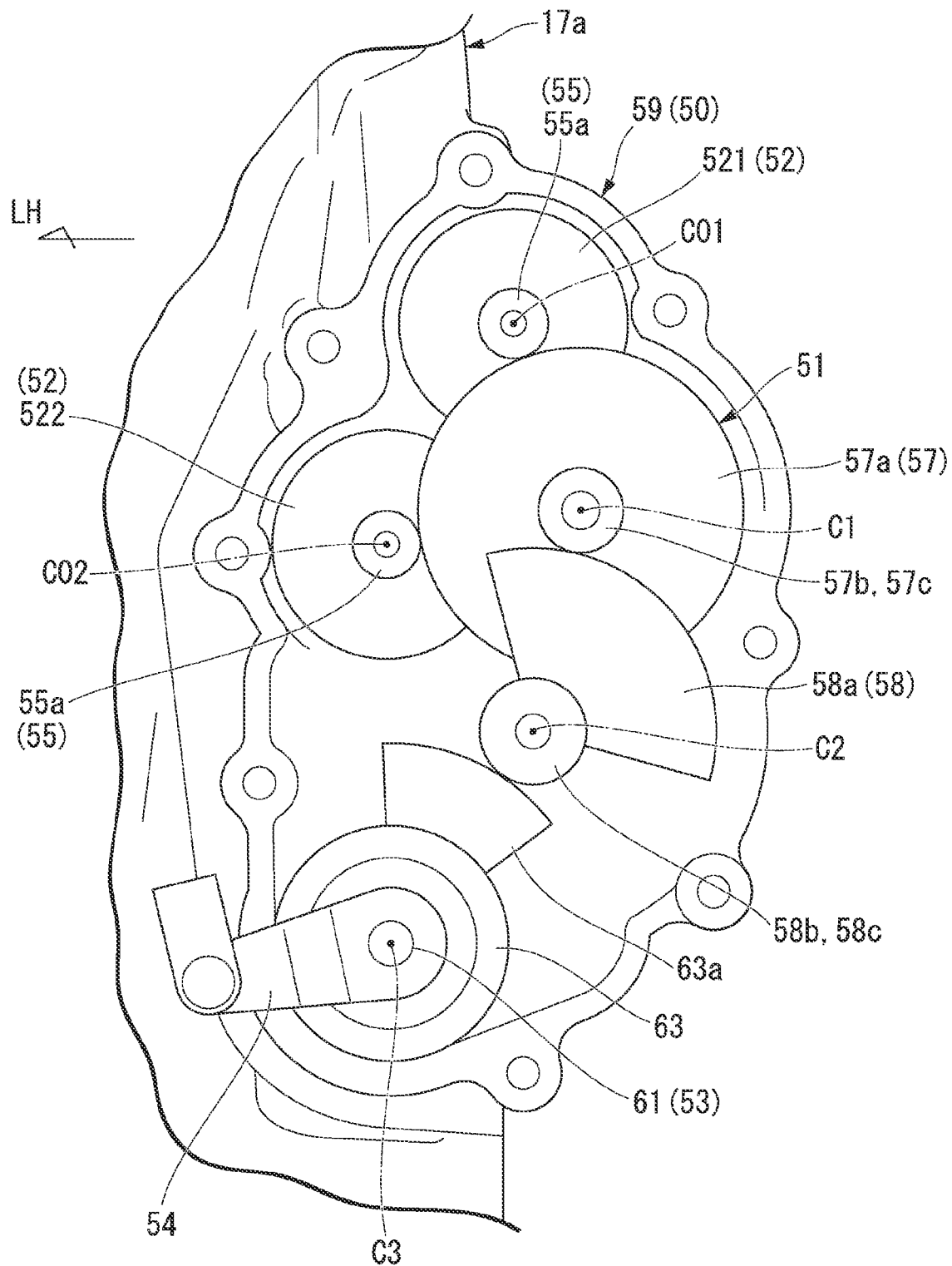
FIG. 5 is a view along an arrow V in FIG. 1 showing a clutch actuator when seen in an axial direction.
Figure 6:
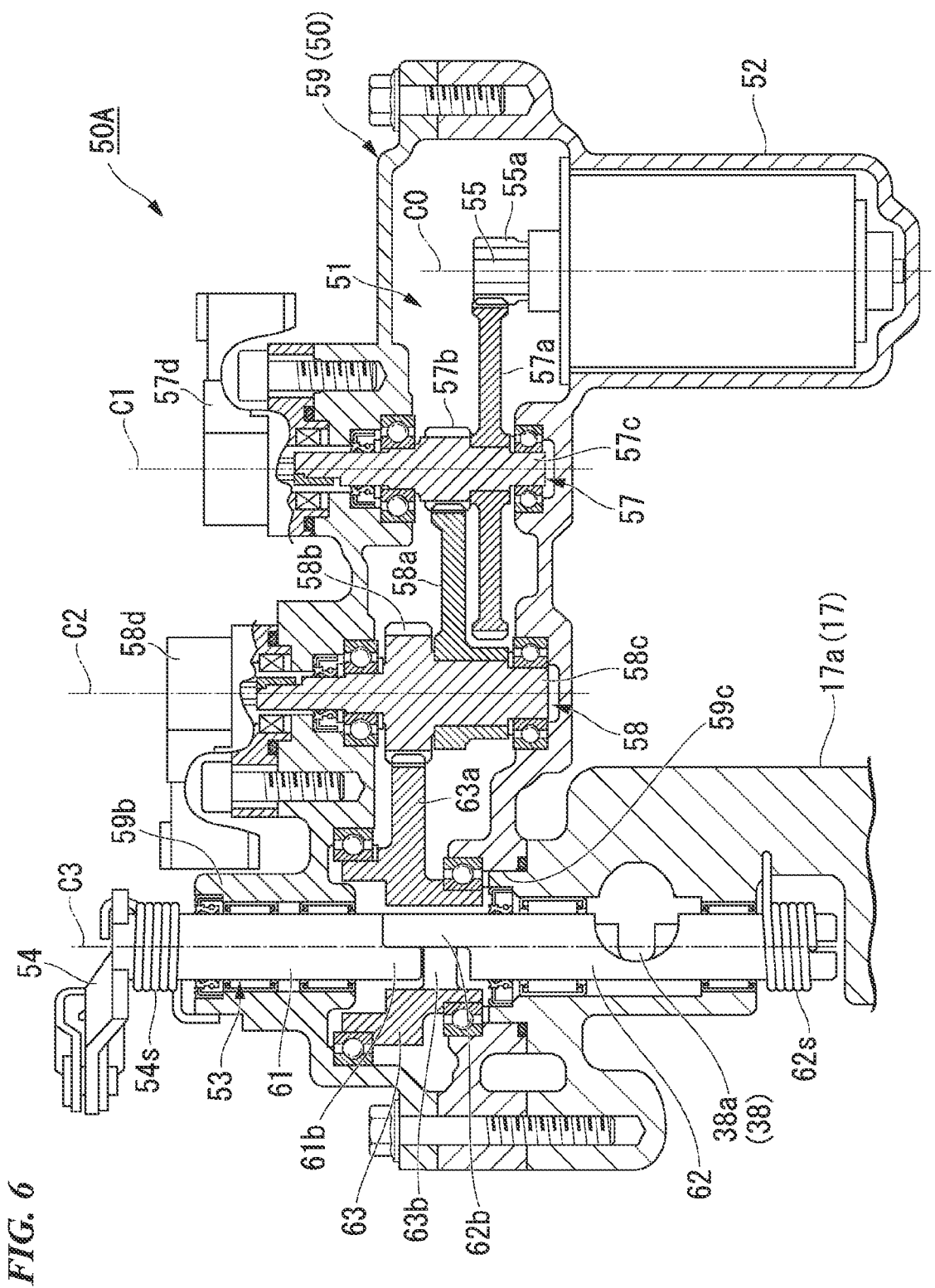
FIG. 6 is a deployed cross-sectional view of the clutch actuator in the axial direction.

Referring to FIG. 5 and FIG. 6 together, the clutch actuator 50 controls a working torque applied to a release shaft 53 in order to connect and disconnect the clutch apparatus 26. The clutch actuator 50 includes an electric motor 52 (hereinafter, simply referred to as the motor 52) as a driving source, and a speed reduction mechanism 51 configured to transmit a driving force of the motor 52 to the release shaft 53.

The ECU 40 calculates the following current value of the clutch apparatus 26 on the basis of a preset calculation program. This current value is a value of current supplied to the motor 52 in order to connect and disconnect the clutch apparatus 26. The current supplied to the motor 52 is obtained from a correlation with the torque output to the motor 52. A target torque of the motor 52 is proportional to a working torque (a driven clutch lever torque, which will be described below) applied to the release shaft 53. A value of the current supplied to the motor 52 is detected by a current sensor 40b included in the ECU 40. According to the change of the detection value, actuation of the clutch actuator 50 is controlled. The clutch actuator 50 will be described below in detail.

<Clutch Apparatus>

Figure 11:
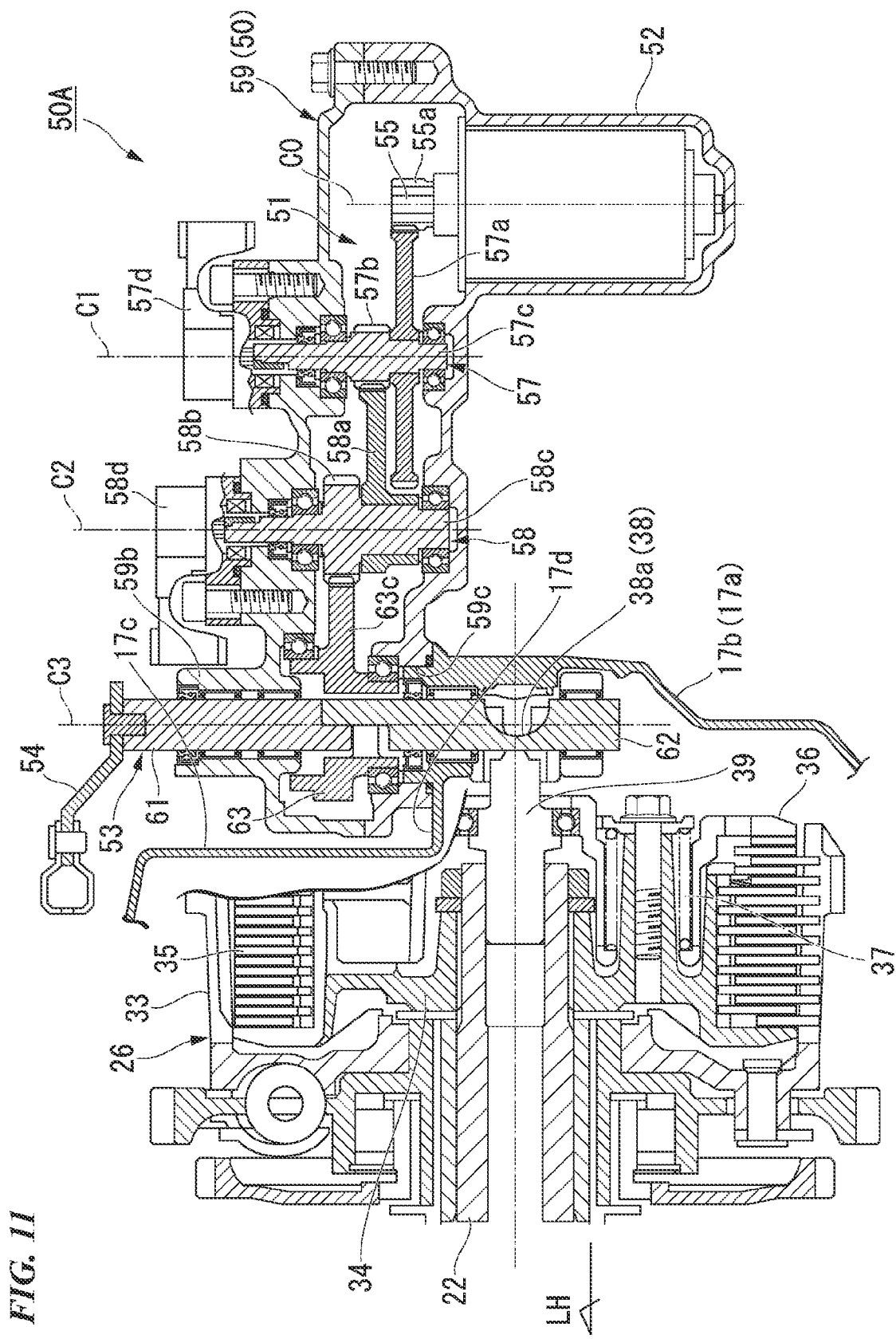
FIG. 11 is a cross-sectional view corresponding to FIG. 6 in a state in which the clutch actuator is attached to a right cover.

As shown in FIG. 2 and FIG. 11, the clutch apparatus 26 of the embodiment is a multi-plate clutch obtained by stacking a plurality of clutch plates 35 in the axial direction, and a wet clutch disposed in an oil chamber in the right cover 17a. The clutch apparatus 26 includes an outer clutch 33, a center clutch 34, and the plurality of clutch plates 35.

The outer clutch 33 is driven by receiving a rotational moving force normally transmitted from the crankshaft 14. The center clutch 34 is disposed inside the outer clutch 33 and integrally rotatably supported by the main shaft 22. The plurality of clutch plates 35 are stacked between the outer clutch 33 and the center clutch 34 and frictionally engaged with each other.

A pressure plate 36 having substantially the same diameter as the clutch plates 35 is disposed on a right side of the stacked clutch plates 35 (an outer side in the vehicle width direction). The pressure plate 36 is biased leftward by receiving an elastic load of a clutch spring 37, and the stacked clutch plates 35 are pressure-welded (frictionally engaged). Accordingly, the clutch apparatus 26 is in a connected state in which power transmission is possible. The clutch apparatus 26 is a normally closed clutch that is in a connected state at normal times when there is no input from the outside.

Release of the pressure welding (frictional engagement) is performed by actuation of a release mechanism 38 inside the right cover 17a. The actuation of the release mechanism 38 is performed at least one of the operation of the clutch lever 4b by an occupant and application of a torque by the clutch actuator 50.

<Release Mechanism>

As shown in FIG. 2 and FIG. 11, the release mechanism 38 includes a lifter shaft 39, and the release shaft 53.

The lifter shaft 39 is held in the right side portion of the main shaft 22 to be reciprocally movable in the axial direction. The release shaft 53 is disposed with an axial direction perpendicular to the lifter shaft 39, and held pivotably around an axis on an outer side portion of the right cover 17a.

Line C3 in the drawings shows a center axis of the release shaft 53 extending in an upward/downward direction. The release shaft 53 is inclined rearward in the axial direction to be disposed rearward as it goes upward in the vertical direction when seen in the axial direction of the main shaft 22 (when seen in a side view of the vehicle) (see FIG. 1). The upper portion of the release shaft 53 protrudes outward from the right cover 17a, and a driven clutch lever 54 is integrally rotatably attached to the upper portion of the release shaft 53. The driven clutch lever 54 is connected to the clutch lever 4b via an operation cable 54c.

An eccentric cam portion 38a is provided in a lower portion of the release shaft 53 located inside the right cover 17a. The eccentric cam portion 38a is engaged with a left end portion of the lifter shaft 39. The release shaft 53 is pivoted around an axial center thereof to move the lifter shaft 39 rightward through actuation of the eccentric cam portion 38a. The lifter shaft 39 is configured to be reciprocally moved integrally with the pressure plate 36 of the clutch apparatus 26. Accordingly, when the lifter shaft 39 is moved rightward, the pressure plate 36 is moved (lifted) rightward against a biasing force of the clutch spring 37. Accordingly, frictional engagement between the stacked clutch plates 35 is released. Accordingly, the normally closed clutch apparatus 26 is in a disconnected state in which power transmission is impossible.

Further, the release mechanism 38 is not limited to the eccentric cam mechanism and may include a rack and pinion, a feed screw, or the like. A mechanism configured to connect the clutch lever 4b and the driven clutch lever 54 is not limited to the operation cable 54c and may include a rod, a ring, or the like.

<Clutch Control Mode>

Figure 4:
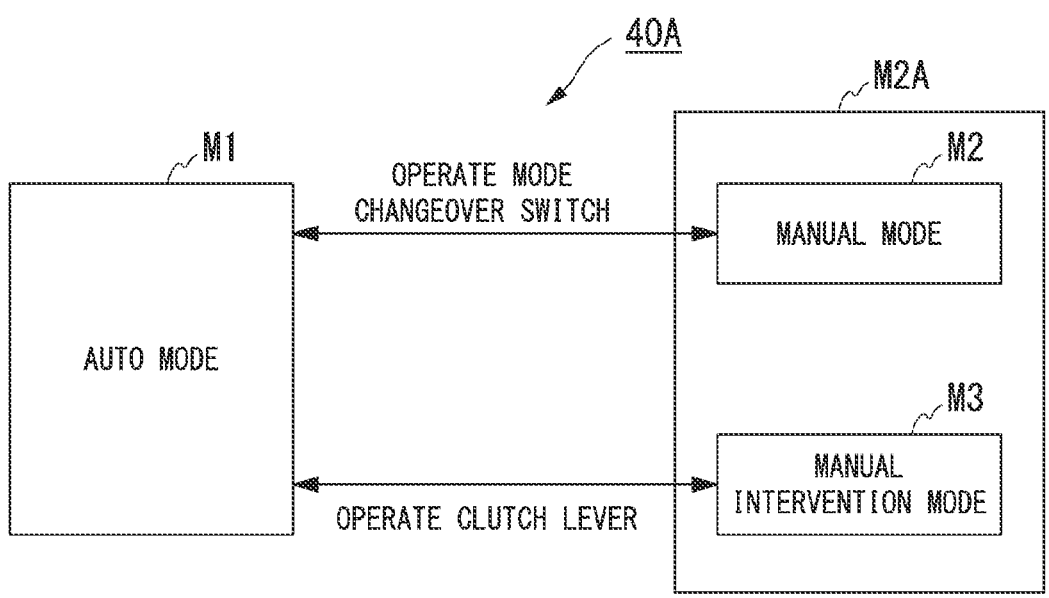
FIG. 4 is a view for describing transition of a clutch control mode of the motorcycle.

As shown in FIG. 4, a clutch control device 40A of the embodiment has three types of clutch control modes. The clutch control mode has an auto mode M1 of performing automatic control, a manual mode M2 of performing a manual operation, and a manual intervention mode M3 of performing a temporary manual operation. The clutch control mode is appropriately transitioned according to operations of a clutch control mode changeover switch 49 and the clutch lever 4b (see FIG. 3 for both). Further, an object containing the manual mode M2 and the manual intervention mode M3 is referred to as a manual system M2A.

The auto mode M1 is a mode of calculating a clutch capacity appropriate for a traveling state and controlling the clutch apparatus 26 according to automatic departure and gear shifting control. The manual mode M2 is a mode of calculating a clutch capacity and controlling the clutch apparatus 26 according to a clutch operation instruction by an occupant. The manual intervention mode M3 is a mode of receiving a clutch operation instruction from an occupant in the auto mode M1, calculating a clutch capacity from the clutch operation instruction and controlling the clutch apparatus 26, which is a temporary manual operation mode. Further, for example, when a state in which the occupant stops the operation of the clutch lever 4b (a completely released state) is maintained for a prescribed time during the manual intervention mode M3, it may be set to return to the auto mode M1.

For example, the clutch control device 40A starts control from the clutch ON state (connected state) in the auto mode M1 when the system starts. In addition, the clutch control device 40A is set to return to the clutch ON in the auto mode M1 when the engine 13 is stopped (during the system OFF). In the normally closed clutch apparatus 26, during the clutch ON, there is no electric power supply to the motor 52 of the clutch actuator 50. Meanwhile, in the clutch OFF state (disconnected state) of the clutch apparatus 26, electric power supply to the motor 52 is held.

The auto mode M1 basically performs clutch control automatically. The auto mode M1 allows the motorcycle 1 to travel with no lever operation. In the auto mode M1, the clutch capacity is controlled on the basis of the throttle opening, the engine rotational frequency, the vehicle speed, the shift sensor output, and the like. Accordingly, the motorcycle 1 can be started without engine stall (meaning engine stop or engine stall) with a throttle operation only. In addition, the motorcycle 1 can be shifted only by a shift operation. In addition, in the auto mode M1, it is switched to the manual intervention mode M3 when the occupant grips the clutch lever 4b. Accordingly, it is possible to switch off the clutch apparatus 26 arbitrarily.

Meanwhile, in the manual mode M2, the clutch capacity can be controlled by the lever operation of the occupant (i.e., the clutch apparatus 26 can be connected and disconnected). The auto mode M1 and the manual mode M2 can be switched to each other.

This switching is performed by, for example, operating the clutch control mode changeover switch 49 (see FIG. 3) during stopping of the motorcycle 1. Further, the clutch control device 40A may include an indicator showing that the lever operation is effective during transition to the manual system M2A (the manual mode M2 or the manual intervention mode M3).

The manual mode M2 is based on manual clutch control. The manual mode M2 can control the clutch capacity according to the operation angle of the clutch lever 4b (and an operation angle of the driven clutch lever 54). Accordingly, it is possible to control the connection/disconnection of the clutch apparatus 26 according to the intention of the occupant. Further, even in the manual mode M2, the clutch control can be automatically intervened when the shift operation is performed without clutch operation. Hereinafter, the operation angle of the driven clutch lever 54 is referred to as a driven clutch lever operation angle.

In the auto mode M1, connection/disconnection of the clutch apparatus 26 is automatically performed by the clutch actuator 50. Here, by performing the manual clutch operation with respect to the clutch lever 4b, it is possible to temporarily intervene the manual operation in the automatic control of the clutch apparatus 26 (the manual intervention mode M3).

<Manual Clutch Operation>

In the motorcycle 1 shown in FIG. 1, a clutch lever 4b as a clutch manual operator is attached to a base end side (an inner side in the vehicle width direction) of a left grip of the steering handle 4a. The clutch lever 4b is attached via a lever holder 4c (see FIG. 2).

For example, a lever operation sensor 4d (see FIG. 3) is provided on the lever holder 4c. For example, the lever operation sensor 4d detects an operation quantity (pivoting angle) of the clutch lever 4b and converts the operation quantity into an electric signal to output the converted electric signal. In a state in which the operation of the clutch lever 4b is effective (the manual system M2A), the ECU 40 can control actuation of the clutch apparatus 26 based on the output of the lever operation sensor 4d. For example, the lever operation sensor 4d may be a switch configured to detect existence of the operation of the clutch lever 4b.

Referring also to FIG. 2, the clutch lever 4b is connected to the driven clutch lever 54 attached to the release shaft 53 of the clutch apparatus 26 via an operation cable 54c. The driven clutch lever 54 is integrally rotatably attached to an upper end portion of the release shaft 53 protruding from the upper portion of the right cover 17a.

In addition, for example, the clutch control mode changeover switch 49 (see FIG. 3) is provided on a handle switch attached to the steering handle 4a. Accordingly, during the normal operation, the occupant can easily switch the clutch control mode.

<Clutch Actuator>

As shown in FIG. 1, the clutch actuator 50 is attached to a rear upper portion of the right cover 17a on the right side of the crank case 15.

Referring also to FIG. 5 and FIG. 6, the clutch actuator 50 includes the motor 52, and the speed reduction mechanism 51.

The motor 52 is, for example, a DC motor with the release shaft 53 parallel to the axial direction. The motor 52 has a driving shaft 55 disposed to protrude upward.

The speed reduction mechanism 51 transmits a driving force of the motor 52 to the release shaft 53.

In the embodiment, a plurality of (two) motors 52 are provided with respect to a clutch actuator 50. Hereinafter, the motor 52 located on a side of the clutch actuator 50 in the front of the vehicle is referred to as a first motor 521, and the motor 52 located on a side of the first motor 521 in the rear of the vehicle and an inner side in the vehicle width direction is referred to as a second motor 522. Lines C01 and C02 in the drawings indicate center axes (driving axes) of the motors 521 and 522, respectively. For convenience of description, both the motors 521 and 522 may be collectively referred to as the motor 52. In addition, both the axes C01 and C02 are collectively referred to as an axis C0.

The speed reduction mechanism 51 decelerates the rotational moving force output from the motor 52 and transmits it to the release shaft 53. The speed reduction mechanism 51 has, for example, a gear train with the release shaft 53 parallel to the axial direction. The speed reduction mechanism 51 includes a driving gear 55a, a first idle gear 57a, a first small diameter gear 57b, a second idle gear 58a, a second small diameter gear 58b, a driven gear 63a, and a gear case 59.

The driving gear 55a is provided integrally with the driving shaft 55 of each of the motors 521 and 522. The first idle gear 57a is meshed with each of the driving gears 55a. The first small diameter gear 57b is provided coaxially with the first idle gear 57a. The second idle gear 58a is meshed with the first small diameter gear 57b. The second small diameter gear 58b is provided coaxially with the second idle gear 58a. The driven gear 63a is meshed with the second small diameter gear 58b. The gear case 59 accommodates each gear.

The first idle gear 57a and the first small diameter gear 57b are integrally rotatably supported by a first support shaft 57c. The first idle gear 57a, the first small diameter gear 57b and the first support shaft 57c constitute a first idle shaft 57. The second idle gear 58a and the second small diameter gear 58b are integrally rotatably supported by a second support shaft 58c. The second idle gear 58a, the second small diameter gear 58b and the second support shaft 58c constitute a second idle shaft 58. Each of the first support shaft 57c and the second support shaft 58c is rotatably supported by the gear case 59. The second idle gear 58a is a sector gear about the second support shaft 58c. The second idle gear 58a is provided to spread forward from the second support shaft 58c and outward in the vehicle width direction. Line C1 in the drawings is referred to as a center axis of the first idle shaft 57, and line C2 is referred to as a center axis of the second idle shaft 58.

The driven gear 63a is integrally rotatably provided on the release shaft 53. The driven gear 63a is a sector gear about the release shaft 53. The driven gear 63a is provided to spread forward from the release shaft 53. A downstream-side gear in the speed reduction mechanism 51 has a small rotation angle. For this reason, the second idle gear 58a and the driven gear 63a may be sector gears with a small rotation angle.

As a result, the speed reduction mechanism 51 and the clutch actuator 50 can be reduced in size. That is, even when a large-diameter reduction gear is provided in order to increase the reduction ratio, the following effects can be obtained by cutting out areas other than the meshing range of the reduction gear to form a fan shape. That is, in particular, it is possible to suppress overhanging of the speed reduction mechanism 51 to the outer side in the vehicle width direction, and to achieve weight reduction of the speed reduction mechanism 51.

With such a configuration, the motor 52 and the release shaft 53 can always be interlocked via the speed reduction mechanism 51. Accordingly, a system configured to directly connect and disconnect the clutch apparatus 26 is constituted by the clutch actuator 50.

Each gear is a flat spur gear with a reduced thickness in the axial direction, and the gear case 59 is also formed in a flat shape with a reduced thickness in the axial direction. Accordingly, the speed reduction mechanism 51 becomes less noticeable when viewed from the side of the vehicle. A first rotation angle sensor 57d and a second rotation angle sensor 58d are provided on an upper surface side of the gear case 59. The first rotation angle sensor 57d and the second rotation angle sensor 58d are connected to one end portions of the first idle shaft 57 and the second idle shaft 58 to detect rotation angles thereof, respectively.

The motor 52 is disposed to protrude downward from the front portion of the gear case 59. Accordingly, the motor 52 can be disposed as described below. That is, a bulging portion 17b that covers the clutch apparatus 26 in the right cover 17a can be disposed forward to avoid it. For this reason, outward overhanging of the clutch actuator 50 in the vehicle width direction is suppressed.

Referring to FIG. 1 and FIG. 11, the right cover 17a defines the following range as the bulging portion 17b that bulges outward in the vehicle width direction. The range is a circular range coaxial with the clutch apparatus 26 when seen from the side of the vehicle. A cover concave portion 17c is formed in an area of the bulging portion 17b, which faces upward and rearward. The cover concave portion 17c changes the outer surface inward in the vehicle width direction with respect to the remaining portion. A lower end portion of the cover concave portion 17c is a stepped portion 17d that changes the outer surface of the bulging portion 17b into a stepped shape. An upper portion of the release shaft 53 protrudes obliquely upward and rearward from the stepped portion 17d.

A driving force of the motor 52 is decelerated as described below and transmitted to the release shaft 53. That is, the driving force of the motor 52 is decelerated between the driving gear 55a and the first idle gear 57a, decelerated between the first small diameter gear 57b and the second idle gear 58a, and further decelerated between the second small diameter gear 58b and the driven gear 63a.

<Release Shaft>

Figure 7:
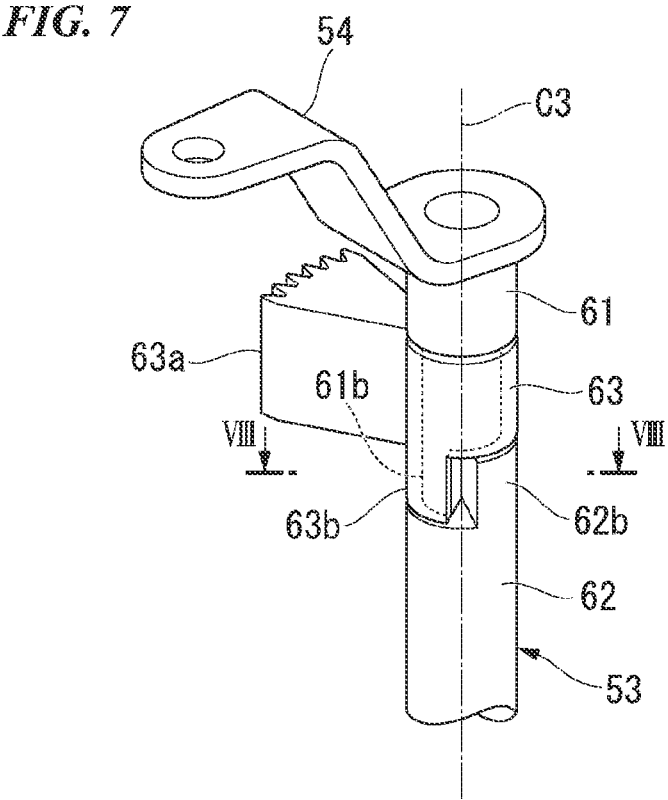
FIG. 7 is a perspective view of a release shaft that operates a clutch apparatus.
Figure 8:
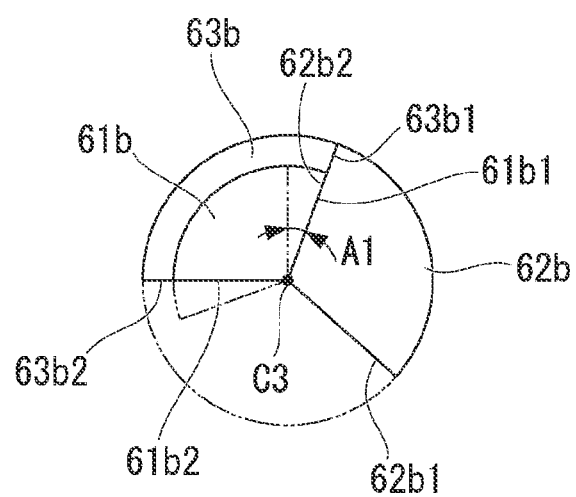
FIG. 8 is a cross-sectional view along line VIII-VIII in FIG. 7.

As shown in FIG. 6 to FIG. 8, the release shaft 53 is divided into a plurality of elements in order to individually receive the input from the clutch actuator 50 and the input from the operation of the occupant to be pivotable.

The release shaft 53 includes an upper release shaft 61 that constitutes an upper portion, a lower release shaft 62 that constitutes a lower portion, and an intermediate release shaft 63. The intermediate release shaft 63 is disposed to bridge between a lower end portion of the upper release shaft 61 and an upper end portion of the lower release shaft 62.

The upper release shaft 61 is formed in a columnar shape. The upper release shaft 61 is rotatably supported by an upper boss portion 59b of the gear case 59. The upper release shaft 61 has an upper end portion that protrudes outward from the gear case 59. The driven clutch lever 54 is integrally rotatably supported by the upper end portion of the upper release shaft 61. A return spring 54s is attached to the driven clutch lever 54. The return spring 54s applies a biasing force in a direction opposite to pivotal movement by the operation of the clutch lever 4b (pivotal movement in a clutch disconnecting direction) to the driven clutch lever 54.

The lower release shaft 62 is formed in a columnar shape. The lower release shaft 62 has a lower portion rotatably supported inside the right cover 17a. The lower portion of the lower release shaft 62 faces inside the gear case 59. The eccentric cam portion 38a of the release mechanism 38 is formed on the lower portion. A lower return spring 62s is attached to the lower end portion of the lower release shaft 62. The lower return spring 62s applies a biasing force in a direction opposite to the pivotal movement in the clutch disconnecting direction to the lower release shaft 62.

A manual operation-side cam 61b extending in the axial direction with a fan-shaped cross section is provided on the lower end portion of the upper release shaft 61.

A clutch-side cam 62b extending in the axial direction with a fan-shaped cross section is provided on the upper end portion of the lower release shaft 62. The clutch-side cam 62b is provided in a range that avoids the manual operation-side cam 61b in the circumferential direction.

The lower end portion (the manual operation-side cam 61b) of the upper release shaft 61 and the upper end portion (the clutch-side cam 62b) of the lower release shaft 62 overlap each other in the axial direction while avoiding each other in the circumferential direction. Accordingly, one side surface 61b1 of the manual operation-side cam 61b in the circumferential direction can press the other side surface 62b2 of the clutch-side cam 62b in the circumferential direction and rotate the lower release shaft 62 (see FIG. 9B and FIG. 10B).

The other side surface 61b2 of the manual operation-side cam 61b in the circumferential direction and one side surface 62b1 of the clutch-side cam 62b in the circumferential direction are separated from each other in the circumferential direction. Accordingly, when there is an input to the clutch-side cam 62b from the clutch actuator 50, the lower release shaft 62 can be rotated (normally rotated) independently from the upper release shaft 61 (see FIG. 9A and FIG. 10A).

The intermediate release shaft 63 is formed in a cylindrical shape. The intermediate release shaft 63 can be inserted through the engagement portion (upper and lower shaft engagement portions) of the lower end portion of the upper release shaft 61 and the upper end portion of the lower release shaft 62. The driven gear 63a can be integrally rotatably supported by the intermediate release shaft 63.

A control operation-side cam 63b extending in the axial direction with a fan-shaped cross section is provided on the intermediate release shaft 63.

The control operation-side cam 63b overlaps the clutch-side cam 62b in the axial direction while avoiding the clutch-side cam 62b of the lower release shaft 62 in the circumferential direction. Accordingly, one side surface 63b1 of the control operation-side cam 63b in the circumferential direction can press the other side surface 62b2 of the clutch-side cam 62b in the circumferential direction to rotate the lower release shaft 62.

In addition, the control operation-side cam 63b is disposed to avoid the manual operation-side cam 61b of the upper release shaft 61 in axial direction or the radial direction. Accordingly, when the input from the clutch actuator 50 can be transmitted to the clutch-side cam 62b, the lower release shaft 62 can be rotated independently from the upper release shaft 61. In addition, when there is a manual operation, the upper release shaft 61 can be rotated independently from the intermediate release shaft 63 on the control side.

The other side surface 63b2 of the control operation-side cam 63b in the circumferential direction and the one side surface 62b1 of the clutch-side cam 62b in the circumferential direction are separated from each other in the circumferential direction. Accordingly, when there is an input to the clutch-side cam 62b from the manual operation-side cam 63b, the lower release shaft 62 can be rotated independently from the intermediate release shaft 63.

Referring to FIG. 11, the clutch actuator 50 pivotably holds the upper release shaft 61 and the intermediate release shaft 63 with the gear case 59. The clutch actuator 50, including the upper release shaft 61 and the intermediate release shaft 63, constitutes an integrated actuator unit 50A.

The lower release shaft 62 is rotatably held on the right cover 17a. In the stepped portion 17d of the cover concave portion 17c of the right cover 17a, an opening portion 17e is provided and a fastening portion 17f of the gear case 59 is also provided. An upper end portion of the lower release shaft 62 protrudes from the opening portion 17e. An opening portion 59c is provided in a portion of the gear case 59 facing the stepped portion 17d of the cover concave portion 17c. The opening portion 59c faces the upper end portion of the lower release shaft 62 inside the gear case 59.

In such a configuration, when the actuator unit 50A is attached to the right cover 17a, the linear release shaft 53 is configured. The release shaft 53 is constituted by connecting the upper release shaft 61, the intermediate release shaft 63 and the lower release shaft 62 to each other.

The power unit PU of the embodiment can be configured as follows for a manual clutch type power unit in which the connection/disconnection operation of the clutch apparatus 26 is performed not by electrical control but by the operation of the driver. That is, the power unit PU can be configured by replacing the right cover 17a and the release shaft 53 and retrofitting the actuator unit 50A. For this reason, the actuator unit 50A can also be attached to power units of different models. For this reason, a semi-automatic gear shifting system (automatic clutch type gear shifting system) can be easily configured by sharing the actuator unit 50A among multiple models.

<Clutch Control>

Figure 12:
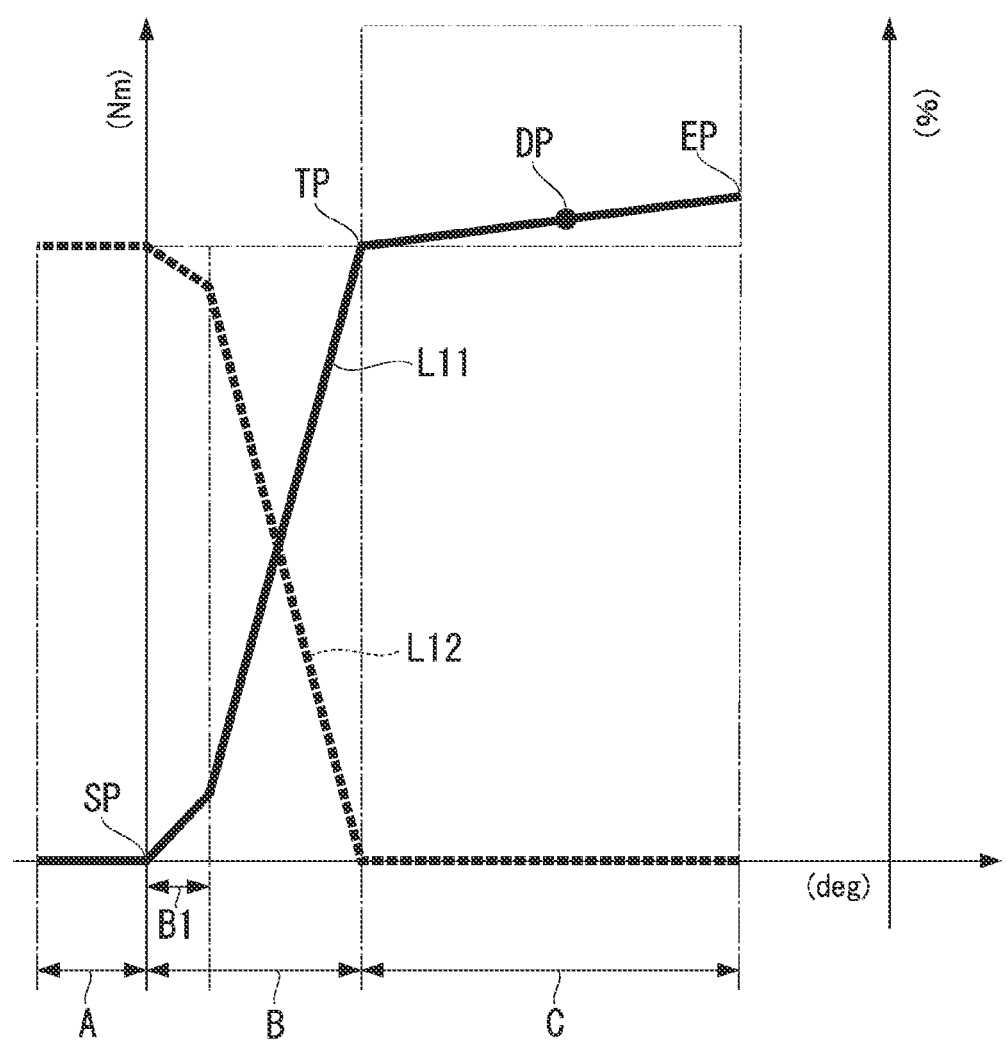
FIG. 12 is a graph showing clutch control characteristics, a longitudinal axis thereof showing an output value of the clutch actuator, and a lateral axis showing an operation quantity of a release mechanism.

Next, the clutch control of the embodiment will be described with reference to the graph of FIG. 12. The graph of FIG. 12 is an image of clutch characteristics in the auto mode M1. In the graph of FIG. 12, a longitudinal axis shows a torque (Nm) applied to the driven clutch lever 54 and a clutch capacity (%), and a lateral axis shows an operation angle (deg) of the driven clutch lever 54. The operation angle of the driven clutch lever 54 is an operation angle of the lower release shaft 62.

The torque of the driven clutch lever 54 is a torque of the lower release shaft 62. This torque corresponds to a torque value calculated by multiplying the following primary torque value by the reduction ratio of the speed reduction mechanism 51. The primary torque value is obtained based on a supply current value to the motor 52 from a correlation between the supply current to the motor 52 and the torque generated by the motor 52.

Hereinafter, the torque of the driven clutch lever 54 is referred to as a driven clutch lever torque. The correlation between the driven clutch lever operation angle and the driven clutch lever torque is shown by line L11 in the graph. The correlation between the driven clutch lever operation angle and the clutch capacity is shown by line L12 in the graph. Line L11 is a line showing an output value (reference output value) of the clutch actuator 50 when the clutch apparatus 26 is connected and disconnected in a state in which the manual operation does not intervene.

In the auto mode M1 of the normally closed clutch, when the driven clutch lever torque (motor output) is "0," there is no operation input (input to the disconnection side) for the clutch apparatus 26, and the clutch capacity is 100%. That is, the clutch apparatus 26 maintains a connected state. This state corresponds to a region A of the lateral axis of FIG. 12. The region A is a play region of the driven clutch lever 54. In the region A, there is no motor output, and the driven clutch lever torque changes at "0." In region A, there is no operation of the clutch apparatus 26 and the clutch capacity changes at 100%.

Referring also to FIG. 8, in the region A, the one side surface 61b1 of the manual operation-side cam 61b of the release shaft 53 in the circumferential direction does not press the other side surface 62b2 of the clutch-side cam 62b in the circumferential direction. Here, the manual operation-side cam 61b is separated from the clutch-side cam 62b by the biasing force of the return spring 54s (shown by a dotted line in FIG. 8). In the region A, the driven clutch lever 54 is in a play state in which the manual operation-side cam 61b is able to approach or separate from the clutch-side cam 62b by an angle A1 in the drawings. For example, in the region A, the one side surface 63b1 of the control operation-side cam 63b in the circumferential direction abuts the other side surface 62b2 of the clutch-side cam 62b in the circumferential direction.

Referring to FIG. 12, when the driven clutch lever operation angle increases and passes the region play A, the driven clutch lever operation angle shifts to a half clutch region B. In the half clutch region B, the driven clutch lever torque starts to increase due to the actuation of the motor 52.

Figure 9A:
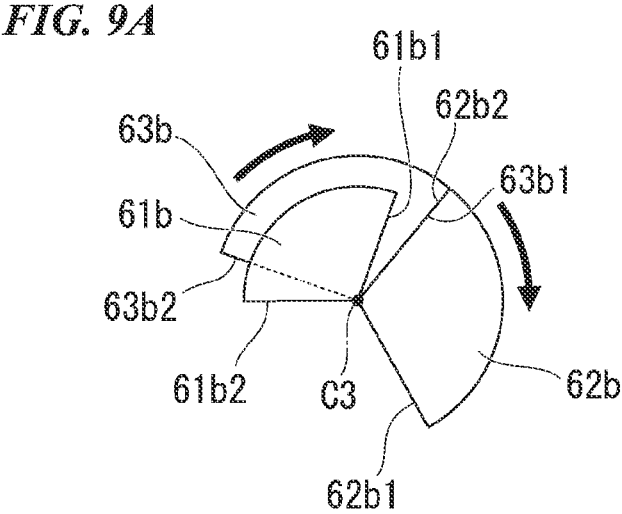
FIG. 9A is a cross-sectional view corresponding to FIG. 8 showing an action of the release shaft in a half clutch region during driving in the clutch actuator.
Figure 9B:
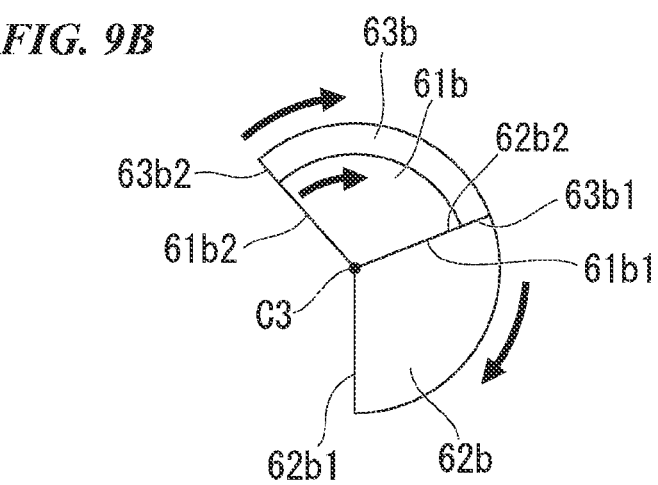
FIG. 9B is a cross-sectional view corresponding to FIG. 8 showing an action of the release shaft in the half clutch region during manual intervention.

Referring also to FIG. 9A, in the half clutch region B, the control operation-side cam 63b presses the clutch-side cam 62b and rotates the lower release shaft 62. When the driven clutch lever torque increases, the release mechanism 38 lifts the clutch apparatus 26 to reduce the clutch capacity. That is, the clutch apparatus 26 is in a half clutch state in which power transmission is partially possible. Reference sign SP in FIG. 12 shows a starting position of an operation of switching from the play region A to the half clutch region B (an operation starting position). In the half clutch region B, when the manual operation intervenes, the manual operation-side cam 61b abuts the clutch-side cam 62b. Here, the manual operation-side cam 61b cooperates with the control operation-side cam 63b to rotate the lower release shaft 62 (see FIG. 9B).

Referring to FIG. 12, in the half clutch region B, the driven clutch lever torque suddenly increases according to an increase in driven clutch lever operation angle, and the clutch apparatus 26 is operated toward the disconnection side. For example, at the beginning of the half clutch region B, a shock absorbing region B1 is set in which the increase in driven clutch lever torque is gradual with respect to the increase in driven clutch lever operation angle.

In the half clutch region B, the clutch capacity sharply decreases with the increase in the driven clutch lever operation angle in inverse proportion to the increase in the driven clutch lever torque. In the shock absorbing region B1 at the beginning of the half clutch region B, the clutch capacity slows down as the driven clutch lever torque increases slowly.

When the driven clutch lever operation angle passes a touch point TP, which is the end point of the half clutch region B, the increase in the driven clutch lever torque becomes gentler than that of the shock absorbing region B1. The region after the touch point TP in the driven clutch lever operation angle becomes, for example, a clutch disconnection region C where the clutch capacity remains equivalent to "0." The clutch disconnection region C is, for example, an operation margin region for the driven clutch lever 54 or the like to operate up to a mechanical operation limit position. In the clutch disconnection region C, the driven clutch lever torque increases slightly. This increment corresponds to the increment of the clutch spring load accompanying the movement of the lift parts of the clutch apparatus 26. Reference sign EP in FIG. 12 indicates a full lift position, which is the end point of the clutch disconnection region C.

For example, a standby position DP is set to an intermediate position in the clutch disconnection region C. At the standby position DP, the following driven clutch lever torque is applied. The driven clutch lever torque at this time is slightly higher than the touch point TP where the clutch apparatus 26 starts connection. At the touch point TP, some torque transmission may occur due to an operation error. On the other hand, by applying the driven clutch lever torque up to the torque of the standby position DP, the torque transmission of the clutch apparatus 26 is completely cut off. In addition, at the standby position DP, by applying a slightly lower driven clutch lever torque to the full lift position EP, it is possible to make the clutch apparatus 26 ineffective. That is, at the standby position DP, backlash of each part in the clutch apparatus 26, cancellation of the operation reaction force, or the like, become possible, and operational responsiveness during connection of the clutch apparatus 26 can be enhanced.

Further, when the clutch apparatus 26 is actuated from the connected state to the disconnection side, the starting position SP and the touch point TP are determined as follows. That is, the point where the driven clutch lever torque rises (the starting point of the half clutch region B) is the starting position SP. In addition, the point where the clutch apparatus 26 is completely disconnected (the end point of the half clutch region B) is the touch point TP.

On the contrary, when the clutch apparatus 26 is actuated from the disconnected state to the connection side, the touch point TP and the starting position SP are determined as follows. That is, the point where the clutch apparatus 26 starts connection is the touch point TP. In addition, the point where the clutch apparatus 26 is completely connected is the starting position SP.

Figure 13:
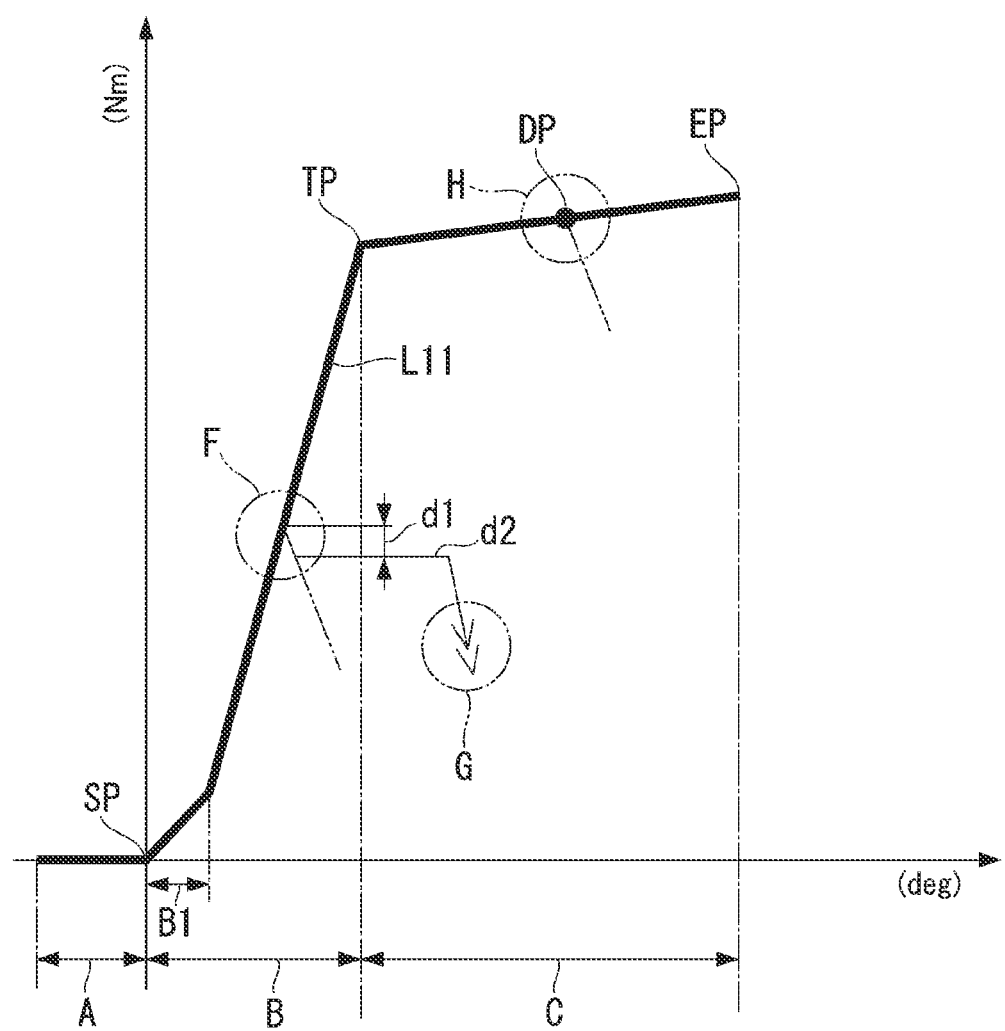
FIG. 13 is a graph corresponding to FIG. 12 and showing a first action of the embodiment.
Figure 14:
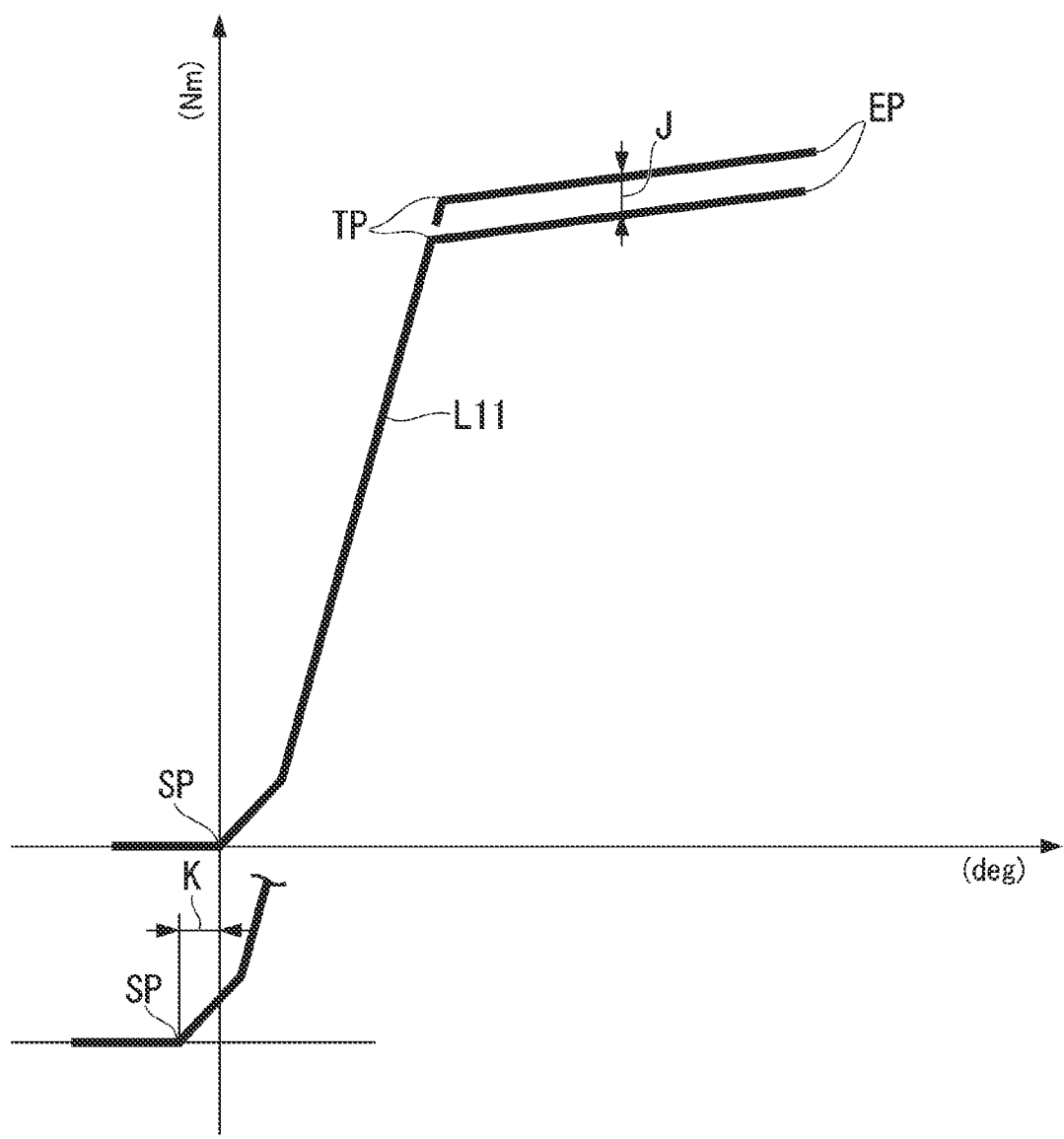
FIG. 14 is a graph corresponding to FIG. 12 and showing a second action of the embodiment.

Referring to FIG. 13, in the half clutch region B, driving of the motor 52 is controlled based on a lift load.

In this control, first, the clutch spring load is set in advance based on a repulsive force of the clutch spring 37. Next, the lift load (an operation load against the clutch spring load) acting on the clutch apparatus 26 is estimated according to the driven clutch lever torque. Then, a load obtained by subtracting the lift load from the clutch spring load is defined as the clutch pressing load that actually acts on the clutch apparatus 26.

The clutch capacity is obtained by "clutch pressing load/ clutch spring load." The electric power supplied to the motor 52 is controlled such that the clutch capacity becomes a target value, and the driven clutch lever torque and the lift load are controlled. A motor current value and a lever operation angle at each of the starting position SP and the touch point TP are set as already decided values. Alternatively, the motor current value and the lever operation angle are set by learning control upon ON or OFF of a power source of the motorcycle 1.

As an example of a sensing configuration, the following configuration is exemplified. That is, the current sensor 40b is provided in the motor control device (the ECU 40), and this detection value is converted into a motor torque, and further converted into a driven clutch lever torque (clutch operation torque).

As shown in FIG. 13, in the half clutch region B, the intervention of the operation (manual operation) of the clutch lever 4b has the following effects. That is, the measured value of the driven clutch lever torque decreases with respect to the correlation line L11 of the driven clutch lever torque set in advance (see a portion F in the drawings). Here, when the decreased level of the driven clutch lever torque exceeds a predetermined threshold d1, it is determined that the manual operation intervention has occurred, and it shifts to the predetermined manual operation intervention control.

In the manual operation intervention control, for example, after manual operation intervention is detected, the control is performed as follows until the increment of the driven clutch lever operation angle reaches a predetermined angle or more. That is, the motor 52 is feedback-controlled so that the driven clutch lever torque maintains a torque d2 after decreasing by the threshold d1. Accordingly, after the operation of the clutch lever 4b, it is possible to suppress the discomfort caused by the sudden loss of torque from the motor 52. After the increment of the driven clutch lever operation angle reaches or exceeds a prescribed angle, the driven clutch lever torque is gradually decreased (see a portion G in the drawings). Accordingly, electric power consumption by continuing to drive the motor 52 can be suppressed while suppressing the discomfort.

In the clutch disconnection region C, driving of the motor 52 is controlled based on the lever position (angle).

As described above, in the clutch disconnection region C, the increase in the driven clutch lever torque due to the lift of the clutch apparatus 26 is small. For this reason, in the clutch disconnection region C, the electric power supplied to the motor 52 is controlled based on the driven clutch lever operation angle. Accordingly, after the touch point TP where the clutch apparatus 26 starts the connection, it becomes possible to more finely control the cutting amount of the clutch apparatus 26.

As an example of the sensing configuration, the following configuration is exemplified. That is, the first rotation angle sensor 57d and the second rotation angle sensor 58d are provided on the first idle shaft 57 and the second idle shaft 58, respectively. Then, the detection value of each of these sensors can be converted into a driven clutch lever operation angle (clutch operation angle). While a pair of the first rotation angle sensor 57d and the second rotation angle sensor 58d are provided against failure, but only one of them may be provided.

As shown in FIG. 13, in the clutch disconnection region C, intervention of the operation (manual operation) of the clutch lever 4b has the following effects. That is, the measured value of the driven clutch lever torque decreases with respect to the correlation line L11 of the driven clutch lever torque set in advance (see a portion H in the drawings).

Figure 10A:
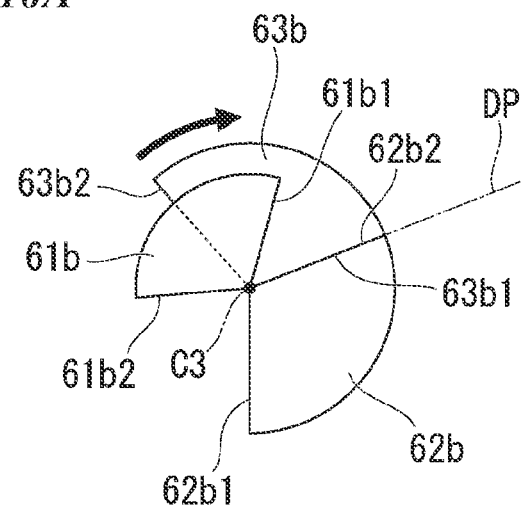
FIG. 10A is a cross-sectional view corresponding to FIG. 8 showing an action of the release shaft at a standby position during driving in the clutch actuator.
Figure 10B:
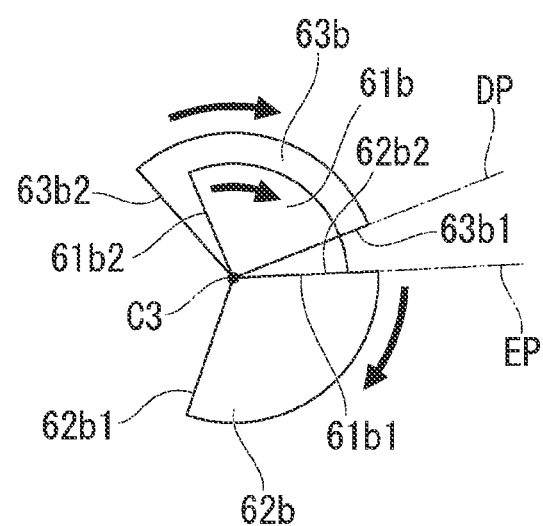
FIG. 10B is a cross-sectional view corresponding to FIG. 8 showing an action of the release shaft at the standby position during manual intervention.

Referring also to FIG. 10A, for example, in the auto mode M1, the torque applied to the clutch-side cam 62b by the control operation-side cam 63b is limited to the torque up to the standby position DP. The torque from the clutch-side cam 62b over the standby position DP to the full lift position EP is applied when the manual operation of gripping the clutch lever 4b is intervened. Here, the torque above the standby position DP is applied from the manual operation-side cam 61b to the clutch-side cam 62b (see FIG. 10B). Here, the control operation-side cam 63b is separated from the clutch-side cam 62b, and the motor output is practically 0.

Even before reaching the standby position DP, if the driven clutch lever operation angle is in the clutch disconnection region C beyond the touch point TP, the following effects are provided. That is, according to the manual operation intervention, the measured value of the driven clutch lever torque becomes practically zero. Accordingly, in the clutch disconnection region C, if the measured value of the driven clutch lever torque changes to a range where it is substantially 0, it is determined that there has been an intervention of the manual operation. Then, it shifts to the predetermined manual operation intervention control.

In the manual operation intervention control, for example, the control is performed as follows until the increment of the driven clutch lever operation angle becomes equal to or greater than the predetermined angle after the manual operation intervention is detected. That is, the motor output is held such that the driven clutch lever operation angle maintains the touch point TP, which is substantially the clutch disconnection position. Accordingly, the engine stall is prevented even when the clutch lever 4b is suddenly released after the manual operation intervention.

In this way, by selectively using load (current) control and position (angle) control according to the situation of the clutch apparatus 26, finer clutch control (optimal control according to the situation and characteristics of the clutch apparatus 26) can be performed.

In the embodiment, the driven clutch lever operation angle (a rotational angle of a gear shaft of the speed reduction mechanism 51) is detected, and the control is performed as follows. That is, in the region to the touch point TP, which is preset (or learnt), (the half clutch region B), the control with the increased weighting of the current value was performed. In the region after the touch point TP (the clutch disconnection region C), the control with the increased weighting of the operation angle was performed.

In addition, in the embodiment, a change in the current value (converted to a torque value) of the motor 52 with respect to the driven clutch lever operation angle is learnt (updated) at a predetermined timing, and a target value is set according to the situation of the clutch apparatus 26. The driving of the motor 52 is feedback-controlled based on the target value and the detection value of the current sensor 40b of the ECU 40.

<Cooperation Control of Clutch Actuator>

Hereinafter, effects of the embodiment will be described with reference to FIG. 15. A longitudinal axis of FIG. 15 shows an engine rotational frequency Ne (rpm), and a lateral axis shows time t (sec).

Figure 15:
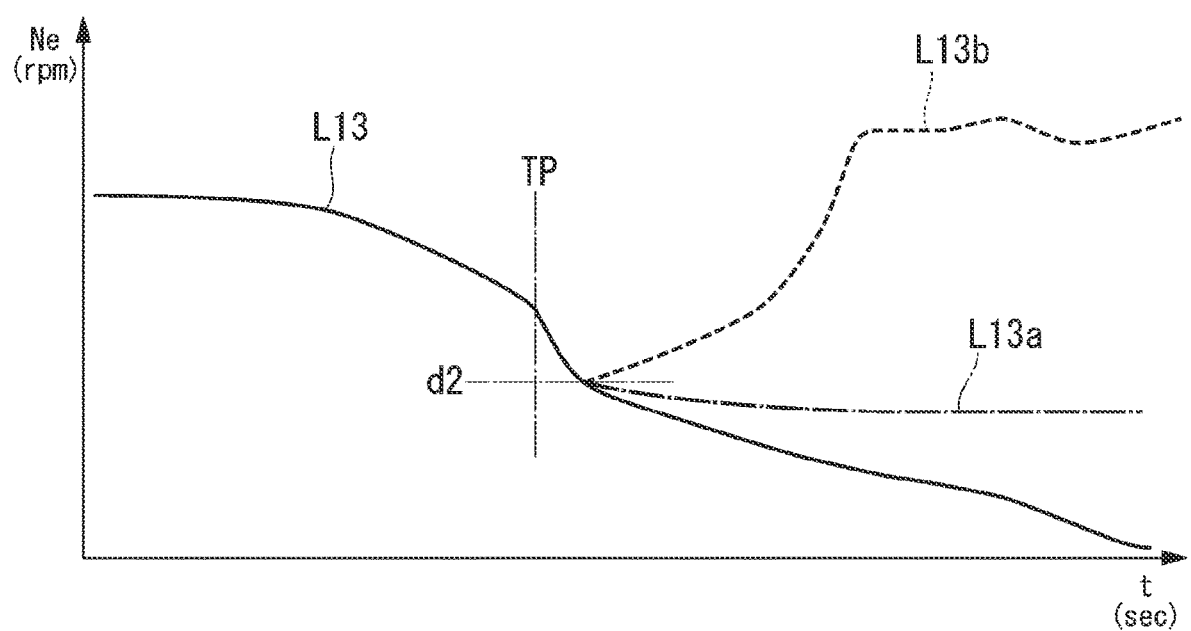
FIG. 15 is a graph showing a change of an engine rotational frequency during a connecting operation of the clutch apparatus.

FIG. 15 shows the following case in a state in which the clutch control mode is in the manual system M2A (the manual mode M2 or the manual intervention mode M3). That is, FIG. 15 shows a case in which a driver performs an operation of gradually releasing the clutch lever 4b (clutch connecting operation) from a state in which the clutch lever 4b is gripped (clutch disconnection state), for example, departure of the motorcycle 1. Transition of the engine rotational frequency in this case is shown by a solid line L13.

When the operating state of the clutch apparatus 26 shifts to the connection side (the side of the starting position SP) from the touch point TP (see FIG. 12) by the release operation of the clutch lever 4b, the following effects are provided. That is, from the time the touch point TP is reached, the engine rotational frequency begins to descend at a rate higher than the regulation. Here, as shown in the range on the right side of Line L13, when the engine rotational frequency continues to drop beyond a predetermined threshold (engine stall decided value) d2, there is a possibility that the engine rotational frequency will become 0 (engine stall).

In order to avoid the engine stall during the above-mentioned connecting operation, the ECU 40 performs the following control. That is, when the engine rotational frequency is equal to or smaller than the engine stall decided value d2, in order to avoid engine stall, the clutch actuator 50 is driven to intervene in clutch control by the driving force of the clutch actuator 50 (engine stall avoiding control). That is, if there is a possibility of engine stall while the driver is performing the operation of releasing the clutch lever 4b (clutch connecting operation), the following control is performed. That is, the clutch actuator 50 is driven to limit the movement of the clutch apparatus 26 to the connecting side.

Accordingly, the operating state of the clutch apparatus 26 is maintained in a state in which the clutch capacity is reduced halfway (the half clutch state before fully connected). Accordingly, the engine rotational frequency is maintained in the vicinity of the threshold d2 (see a dotted line L13a in the drawings). For this reason, it is possible to avoid the engine rotational frequency from continuing to drop beyond the threshold d2 (engine stall as it is).

Meanwhile, if the clutch capacity is simply lowered without knowing the driver's manual operation situation, there is a possibility that the clutch capacity will be lowered too much. In this case, unexpected blow-up of the engine 13 (increase in engine rotational frequency), or the like, (see dotted line L13b in the drawings) may cause great discomfort to the driver.

In the embodiment, by enabling the detection of clutch operation torque by the manual operation of the driver, the following control is possible. That is, if necessary, the clutch actuator 50 is driven to apply a clutch operation torque, making it possible to control the clutch capacity to an appropriate value like line L13a. Accordingly, compared to the engine stall avoiding control, which simply lowers the clutch capacity, it is possible to suppress discomfort to the driver.

Referring to FIG. 2, the clutch control device 40A includes an operating force transmission mechanism 65. The operating force transmission mechanism 65 can transmit the driver's operating force with respect to the clutch lever 4b to the clutch apparatus 26. The operating force transmission mechanism 65 includes the clutch lever 4b, the lever holder 4c, the operation cable 54c, the driven clutch lever 54, the release shaft 53 and the lifter shaft 39.

An operating force sensor 66 configured to detect an operating force of a driver is provided in the operating force transmission mechanism 65. The operating force sensor 66 is, for example, a non-contact type magnetostrictive sensor 66. The operating force sensor 66 is attached to the upper release shaft 61 of the release shaft 53. The operating force sensor 66 detects a torque by magnetically measuring the torsion of the driving shaft. By detecting the operating force using the non-contact type magnetostrictive sensor 66, the operation of the driver is not hindered by the friction and resistance of the sensor. In addition, installation of the sensor is easier than using an adhesion type strain gauge or the like.

Cooperation control of the clutch actuator 50 according to the detection value of the operating force sensor 66 is performed when the engine rotational frequency becomes less than the threshold (engine stall decided value) d2. That is, the cooperation control is performed when it is determined that the clutch actuator 50 needs to be driven (when it is determined that there is a possibility of engine stall), and is in a standby state in other situations.

Figure 16:
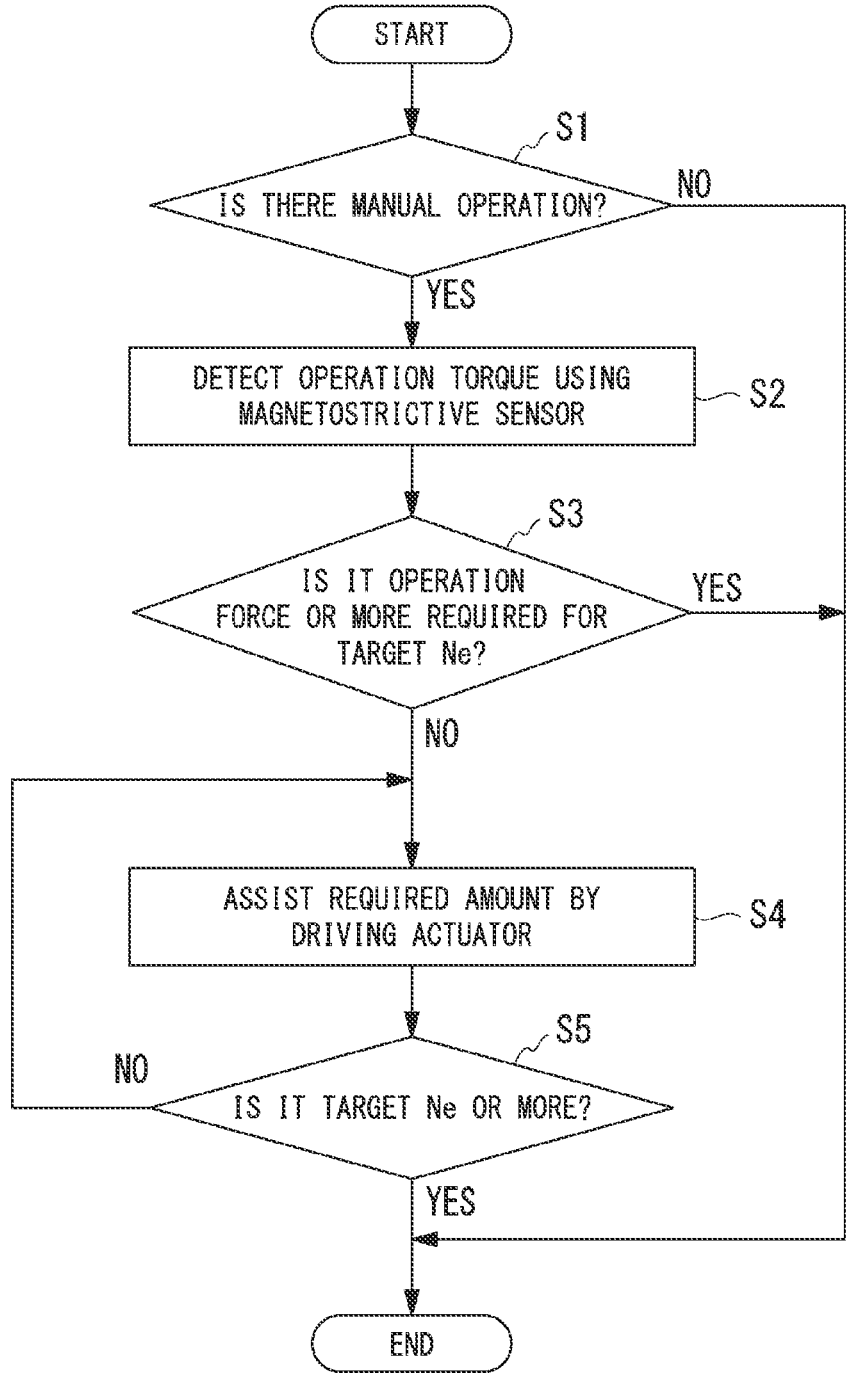
FIG. 16 is a flowchart showing processing of engine rotational frequency control using detection of an operation torque.

Hereinafter, processing including the cooperation control will be described with reference to the flowchart in FIG. 16. This processing is repeatedly executed at a predetermined cycle when the power source is ON (the main switch of the motorcycle 1 is ON).

First, in step S1, it is determined whether or not there was a manual operation for the clutch lever 4b. This determination is performed, for example, by turning ON/OFF the lever operation sensor 4d provided on the lever holder 4c according to the operation of the clutch lever 4b.

In the case of YES (with a manual operation) in step S1, it shifts to step S2. In step S2, detection of the manual operation torque using the magnetostrictive sensor 66 is performed. In the case of NO (with no manual operation) in step S1, the processing is terminated once.

After detection of the operation torque is performed in step S2, it shifts to step S3. In step S3, it is determined whether the manual operation torque detected in step S2 is equal to or greater than an operating force required for maintaining the target engine rotational frequency.

Here, the final clutch operation torque at the release shaft 53 is a torque transmitted to the lower release shaft 62, which is the output shaft to the side of the clutch apparatus 26. This torque is a total value of an actuator torque and a manual operation torque. The actuator torque is a torque of the intermediate release shaft 63 according to the driving of the clutch actuator 50. The manual operation torque is a torque of the upper release shaft 61 according to the operation to the clutch lever 4b.

The actuator torque can be estimated (calculated) based on the driving current of the motor 52 and the reduction ratio of the speed reduction mechanism 51. Meanwhile, a dedicated operating force sensor 66 is required for a manual operation torque. In the embodiment, the non-contact type magnetostrictive sensor 66 is installed on the upper release shaft 61 as a sensor configured to detect a manual operation torque. Accordingly, it does not cause friction and wearing due to the contact between the sensor and the shaft, and does not hinder the driver's operation. In addition, the manual operation torque can be detected with high reliability.

Further, as a torque sensor other than the magnetostrictive type, for example, a strain gauge or a combination of a torsion spring and an angle sensor may be used. In addition, the operating force sensor 66 is not limited to the configuration provided on the release shaft 53. The operating force sensor 66 may be, for example, sensors provided on the clutch lever 4b and the lever holder 4c. In addition, it may be a tension sensor provided on the operation cable 54c.

Returning to FIG. 16, "the operating force required to maintain the target engine rotational frequency" in step S3 is the following operating force. That is, it is the operating force that can slip the clutch apparatus 26 (reduce the clutch capacity) such that the engine rotational frequency can be maintained at the engine stall decided value d2 or more even when the engine rotational frequency is decreased. For example, the relationship between the engine rotational frequency and the clutch capacity is based on the specifications of the clutch apparatus 26 or actual measurements. This relationship is approximated in tabular form or mathematical formula and stored in the ECU 40 in advance.

In the case of YES (more than the required operating force) in step S3, the process is temporarily terminated. In the case of NO (less than the required operating force) in step S3, it shifts to step S4. In step S4, the clutch actuator 50 is driven and assists are started to compensate for the insufficient operating force (clutch operation torque). After that, through step S5, the assists continue until the engine rotational frequency reaches the target value (engine stall decided value) or higher. Then, the processing ends when the engine rotational frequency is equal to or higher than the target value (the engine stall decided value d2). The above-mentioned steps S4 and S5 correspond to the cooperation control.

As described above, the clutch control device 40A according to the embodiment includes the clutch apparatus 26 configured to connect and disconnect power transmission between the engine 13 and the gearbox 21, the clutch actuator 50 configured to output a driving force for operating the clutch apparatus 26, the ECU 40 configured to drive the clutch actuator 50, and the operating force transmission mechanism 65 configured to transmit a operating force of a driver with respect to the clutch lever 4b to the clutch apparatus 26. The operating force sensor 66 configured to detect an operating force of a driver is provided on the operating force transmission mechanism 65. The ECU 40 assists the clutch actuator 50 according to the detection value of the operating force sensor 66.

According to this configuration, in cooperation with the clutch operation (manual operation) by the driver, the clutch actuator 50 can be assisted. Accordingly, assistance such as engine stall avoidance or the like can be performed by driving the clutch actuator 50 while suppressing discomforting behavior with respect to the manual operation by the driver.

In addition, in the above-mentioned clutch control device 40A, the operating force transmission mechanism 65 includes the release shaft 53 configured to receive the operating force of the driver and the driving force of the clutch actuator 50 and transmit the operating force and the driving force toward the clutch apparatus 26. The operating force sensor 66 is attached to the release shaft 53.

According to this configuration, by attaching the operating force sensor 66 to the release shaft 53 configured to receive both the operating force of the driver and the driving force of the clutch actuator 50, the following effects are provided. That is, in the release shaft 53 in which the operating force of the driver and the driving force of the clutch actuator 50 are merged, the operating force of the driver can be detected. Accordingly, when the clutch actuator 50 is cooperation-controlled according to the clutch operation by the driver, the operating force of the driver can be appropriately detected.

In addition, in the above-mentioned clutch control device 40A, the operating force sensor 66 is the non-contact type magnetostrictive sensor 66.

According to this configuration, by detecting the operating force of the driver using the non-contact type magnetostrictive sensor 66, the following effects are provided. That is, the operating force of the driver can be detected without interfering with the operation of the driver due to the friction and resistance of the sensor. In addition, compared to using the adhesion type strain gauge, or the like, installation of the sensor is easier and mass productivity can be increased.

In addition, in the above-mentioned clutch control device 40A, the cooperation control according to the detection value of the operating force sensor 66 is performed when it is determined whether driving of the clutch actuator 50 is necessary according to a change of a control parameter (engine rotational frequency).

According to this configuration, a configuration is possible in which the clutch actuator 50 operates only under timing or conditions that require cooperation control. For this reason, electric power consumption and control load can be suppressed compared to a configuration in which the clutch actuator 50 is always in operation.

Further, the present invention is not limited to the example. For example, the clutch operator is not limited to the clutch lever 4b and may be a clutch pedal or other various operators. The clutch apparatus is not limited to being disposed between the engine and the gearbox and may be disposed between the prime mover and an arbitrary output target other than the gearbox. The prime mover is not limited to the internal combustion engine and may be an electric motor.

It is not limited to an application to the saddle riding vehicle in which the clutch operation is automated, like the embodiment. For example, although it is based on the manual clutch operation, it is also applicable to saddle riding vehicles (so-called saddle riding vehicles equipped with clutch operationless transmission) that enable gear shifting by adjusting the driving force without manual clutch operation under predetermined conditions.

In addition, the saddle riding vehicle includes all vehicles in which the driver straddles the vehicle body, not only motorcycles (including bicycles with prime movers and scooter type vehicles), but also three-wheeled vehicles (in addition to vehicles with one front wheel and two rear wheels, vehicles with two front wheels and one rear wheel are also included) or vehicles with four wheels are also included, and vehicles that include an electric motor as a prime mover are also included.

Then, the configuration in the above-mentioned embodiment is an example of the present invention, and various modifications may be made without departing from the spirit of the invention.

BRIEF DESCRIPTION OF THE REFERENCE SYMBOLS

1: Motorcycle (saddle riding vehicle)
13: Engine (prime mover)
21: Gearbox (output target)
26: Clutch apparatus
40: ECU (control unit)
40A: Clutch control device
50: Clutch actuator
50A: Actuator unit
51: Speed reduction mechanism (transmission mechanism)
52: Motor (driving source)
53: Release shaft
65: Operating force transmission mechanism
66: Operating force sensor
66: Magnetostrictive sensor

What is claimed is:

1. A clutch control device comprising:
a clutch apparatus configured to connect and disconnect power transmission between a prime mover and an output target;
a clutch actuator configured to output a driving force for actuating the clutch apparatus;
a control unit configured to drive the clutch actuator; and
an operating force transmission mechanism configured to transmit an operating force of a driver with respect to a clutch operator to the clutch apparatus,
wherein an operating force sensor configured to detect the operating force of the driver is provided in the operating force transmission mechanism,
the control unit drives the clutch actuator according to a detection value of the operating force sensor,
a release shaft comprises:
an upper release shaft configured to receive the operating force of the driver,
an intermediate release shaft configured to transmit an input from the clutch actuator, and
a lower release shaft configured to be rotated by the upper release shaft and the intermediate release shaft, and
the operating force sensor is attached to the upper release shaft.

2. The clutch control device according to claim 1, wherein the operating force transmission mechanism comprises the release shaft configured to receive the operating force of the driver and the driving force of the clutch actuator and transmit the operating force and the driving force to the clutch apparatus, and the operating force sensor is attached to the release shaft.

3. The clutch control device according to claim 2, wherein the release shaft comprises the upper release shaft configured to receive the operating force of the driver and be provided with a manual operation-side cam on a lower end portion, the lower release shaft configured to be provided with a clutch-side cam on a upper end portion, and the intermediate release shaft disposed to bridge between a lower end portion of the upper release shaft and an upper end portion of the lower release shaft and configured to be provided with a control operation-side cam.

4. The clutch control device according to claim 1, wherein the operating force sensor is a non-contact type magnetostrictive sensor.

5. The clutch control device according to claim 1, wherein cooperation control according to a detection value of the operating force sensor is performed when it is determined that driving of the clutch actuator is necessary according to a change of a predetermined control parameter.

\* \* \* \* \*